(12) United States Patent
Rofougaran

(10) Patent No.: US 8,195,860 B2
(45) Date of Patent: Jun. 5, 2012

(54) COMPUTING DEVICE WITH HANDHELD AND EXTENDED COMPUTING DEVICES

(75) Inventor: Ahmadreza (Reza) Rofougaran, Newport Coast, CA (US)

(73) Assignee: Broadcom Corporation, Irvine, CA (US)

(*) Notice: Subject to any disclaimer, the term of this patent is extended or adjusted under 35 U.S.C. 154(b) by 53 days.

(21) Appl. No.: 12/393,463

(22) Filed: Feb. 26, 2009

(65) Prior Publication Data

US 2009/0198852 A1     Aug. 6, 2009

Related U.S. Application Data

(63) Continuation-in-part of application No. 12/026,681, filed on Feb. 6, 2008.

(51) Int. Cl.
- *G06F 13/00* (2006.01)
- *G06F 9/00* (2006.01)
- *H05K 7/00* (2006.01)

(52) U.S. Cl. .............................. 710/300; 713/2; 361/681

(58) Field of Classification Search .................. 710/300; 713/2; 361/681
See application file for complete search history.

(56) References Cited

U.S. PATENT DOCUMENTS

| | | | | |
|---|---|---|---|---|
| 5,841,424 A * | 11/1998 | Kikinis | ................ | 345/168 |
| 6,438,622 B1 * | 8/2002 | Haghighi et al. | ................ | 710/1 |
| 6,524,240 B1 * | 2/2003 | Thede | ................ | 600/300 |
| 6,549,968 B1 * | 4/2003 | Hart | ................ | 710/303 |
| 7,043,588 B2 * | 5/2006 | Konetski | ................ | 710/303 |
| 7,167,931 B2 * | 1/2007 | Bard et al. | ................ | 710/16 |
| 7,222,207 B2 * | 5/2007 | Falcon | ................ | 710/303 |
| 7,328,297 B2 * | 2/2008 | Chu | ................ | 710/301 |
| 7,797,475 B2 * | 9/2010 | Wilson et al. | ................ | 710/311 |
| 2003/0126335 A1 * | 7/2003 | Silvester | ................ | 710/303 |
| 2003/0171834 A1 * | 9/2003 | Silvester | ................ | 700/94 |
| 2003/0172218 A1 * | 9/2003 | Scott et al. | ................ | 710/303 |
| 2005/0013103 A1 * | 1/2005 | Chandley | ................ | 361/683 |
| 2006/0127034 A1 * | 6/2006 | Brooking et al. | ................ | 386/46 |
| 2007/0263348 A1 * | 11/2007 | Rutledge et al. | ................ | 361/681 |
| 2008/0028102 A1 * | 1/2008 | Peacock | ................ | 709/248 |

\* cited by examiner

*Primary Examiner* — Paul R Myers
*Assistant Examiner* — Christopher a Daley
(74) *Attorney, Agent, or Firm* — Garlick & Markison; Kevin L. Smith

(57) ABSTRACT

A handheld computing unit includes a processing module, memory, a transceiver, a first extended computing unit interface, a second extended computing unit interface, and an interconnection structure operably coupled to the processing module, the memory, the transceiver, and the first and second extended computing unit interfaces. The first extended computing unit interface couples to a first extended computing unit and the second extended computing unit interface coupled to a second extended computing unit such that the handheld computing unit and the extended computing units constitute a computing device.

17 Claims, 24 Drawing Sheets

| devices | HH remote | HH Quasi docked | HH docked |
|---|---|---|---|
| power supply | HH – batt: EXT – PS (off) | HH – batt: EXT – PS (on) | HH – PS &/or BC: EXT – PS (on) |
| removable drive | HH –none: EXT-maybe (off) | HH –none: EXT-maybe (off) | HH –none: EXT-maybe (on) |
| CD-ROM/DVD-ROM drive | HH-no: EXT-yes (off) | HH-yes: EXT-yes (off) | HH-no: EXT-yes (on) |
| Tape Drive | HH-no: EXT-maybe (off) | HH-no: EXT-maybe (off) | HH-no: EXT-maybe (on) |
| Hard Drive | HH-mini (on): EXT-yes (off) | HH-mini (on): EXT-yes (on) | HH-mini (on): EXT-maybe (on) |
| Floppy Drive | HH-no: EXT-maybe (off) | HH-no: EXT-maybe (off) | HH-no: EXT-maybe (on) |
| Host controller | HH-no: EXT-yes (off) | HH-no: EXT-yes (on) | HH-no: EXT-yes (on) |
| AGP expansion slot | HH-no: EXT-yes (off) | HH-no: EXT-yes (on) | HH-no: EXT-yes (on) |
| PCI expansion slot | HH-ind. interface: EXT-yes (off) | HH-ind. interface: EXT-yes (on) | HH-ind. interface: EXT-yes (on) |
| Video card | HH-LCD (on): EXT-yes (off) | HH-LCD (on): EXT-yes (on/off) | HH-LCD (off): EXT-yes (on) |
| sound card | HH-codec (on): EXT-yes (off) | HH-codec (on): EXT-yes (on/off) | HH-codec (off): EXT-yes (on) |
| RAM | HH-yes (on): EXT-yes (off) | HH-yes (on): EXT-yes (on/off) | HH-yes (on/off): EXT-yes (on) |
| RTC | HH-yes (on): EXT-no | HH-yes (on): EXT-no | HH-yes (on): EXT-no |
| CMOS memory (config info) | HH-yes (on): EXT-maybe (on) | HH-yes (on): EXT-maybe (on) | HH-yes (on): EXT-maybe (on) |
| BIOS | HH-yes (on): EXT-maybe (off) | HH-yes (on): EXT-maybe (off) | HH-yes (on): EXT-maybe (on) |
| Microprocessor | HH-yes (on): EXT-yes (off) | HH-yes (on): EXT-yes (on/off) | HH-yes (on/off): EXT-yes (on) |
| USB | HH-yes (on): EXT-yes (off) | HH-yes (on): EXT-yes (on/off) | HH-yes (on/off): EXT-yes (on) |
| Mouse port | HH-no: EXT-yes (off) | HH-no: EXT-yes (off) | HH-no: EXT-yes (on) |
| keyboard port | HH-keypad (on): EXT-yes (off) | HH-keypad (on): EXT-yes (off) | HH-keypad (on/off): EXT-yes (on) |
| Network connection | HH-yes (on): EXT-yes (off) | HH-yes (on): EXT-yes (on/off) | HH-yes (on/off): EXT-yes (on) |
| Parallel port | HH-no: EXT-yes (off) | HH-no: EXT-yes (off) | HH-no: EXT-yes (on) |
| Serial ports | HH-maybe: EXT-maybe (off) | HH-maybe: EXT-maybe (on/off) | HH-maybe: EXT-maybe (on) |
| Flash memory card slot | HH-yes (on): EXT-maybe (off) | HH-yes (on): EXT-maybe (on/off) | HH-yes (on): EXT-maybe (on) |
| cell phone | HH-yes (on): EXT-VoIP (off) | HH-yes (on): EXT-VoIP (off) | HH-yes (transfer): EXT-VoIP (on) |

*FIG. 14*

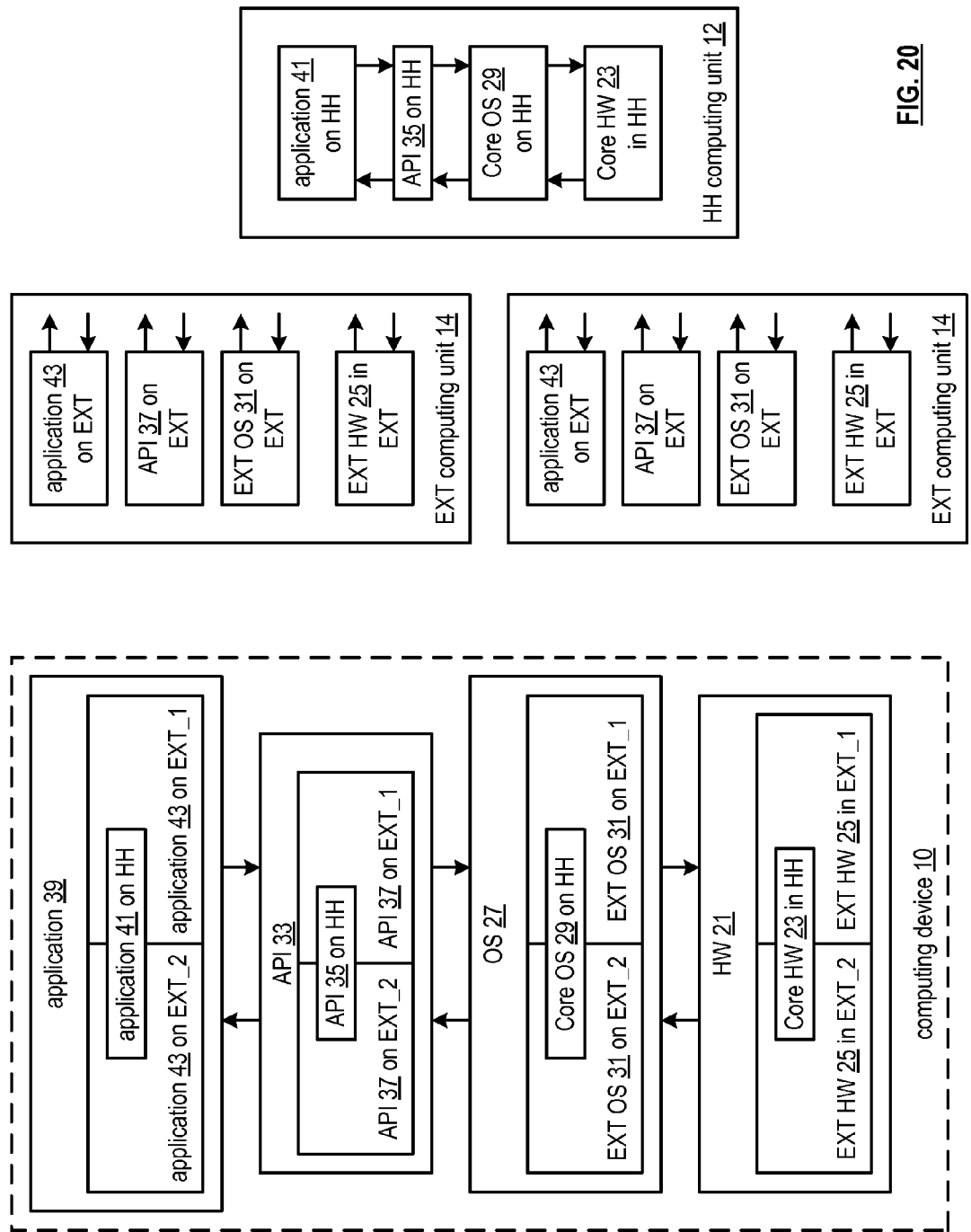

COMPUTING DEVICE WITH HANDHELD
AND EXTENDED COMPUTING DEVICES

This patent application is claiming priority under 35 USC §120 as a continuation in part patent application of patent application entitled COMPUTING DEVICE WITH HANDHELD AND EXTENDED COMPUTING UNITS, having a filing date of Feb. 6, 2008, and Ser. No. 12/026,681.

STATEMENT REGARDING FEDERALLY
SPONSORED RESEARCH OR DEVELOPMENT

NOT APPLICABLE

INCORPORATION-BY-REFERENCE OF
MATERIAL SUBMITTED ON A COMPACT DISC

NOT APPLICABLE

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

Therefore, a need exists for a computing device that includes a handheld computing unit and multiple extended computing units.

BRIEF SUMMARY OF THE INVENTION

The present invention is directed to apparatus and methods of operation that are further described in the following Brief Description of the Several views of the Drawing(s), the Detailed Description of the Drawings, and the claims. Other features and advantages of the present invention will become apparent from the following detailed description of the invention made with reference to the accompanying drawings.

BRIEF DESCRIPTION OF THE SEVERAL
VIEWS OF THE DRAWING(S)

FIG. 14 is a table of an example of devices within a handheld computing unit and extended computing unit that may be active in various modes in accordance with the present invention;

FIG. 19 is a diagram of an example of a handheld computing unit coupled to multiple extended computing units in accordance with the present invention;

FIG. 20 is a diagram of an example of a handheld computing unit n a remote mode with respect to multiple extended computing units in accordance with the present invention;

DETAILED DESCRIPTION OF THE DRAWINGS

Figure 1:
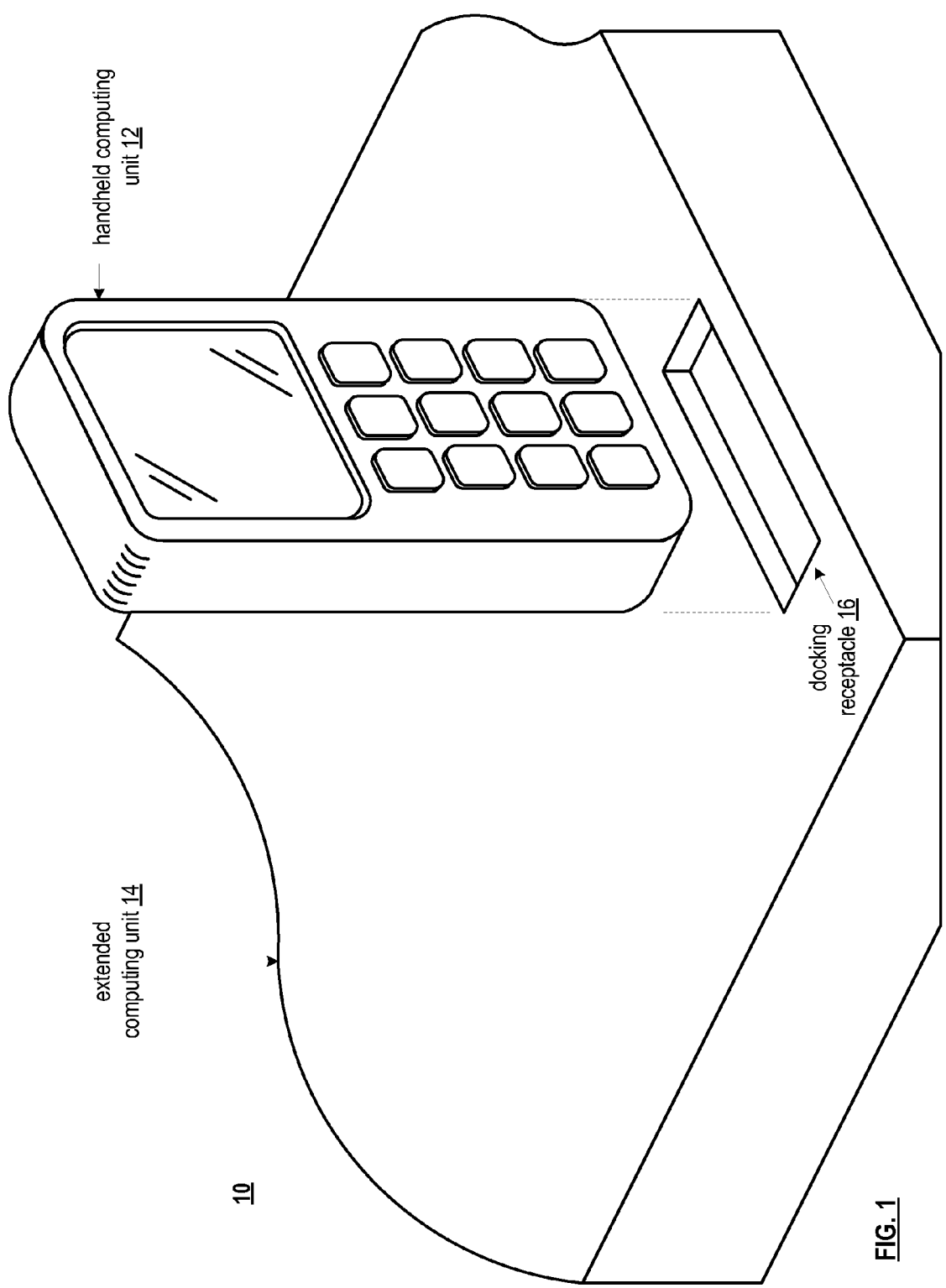
FIG. 1 is a diagram of an embodiment of a handheld computing unit and an extended computing unit in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
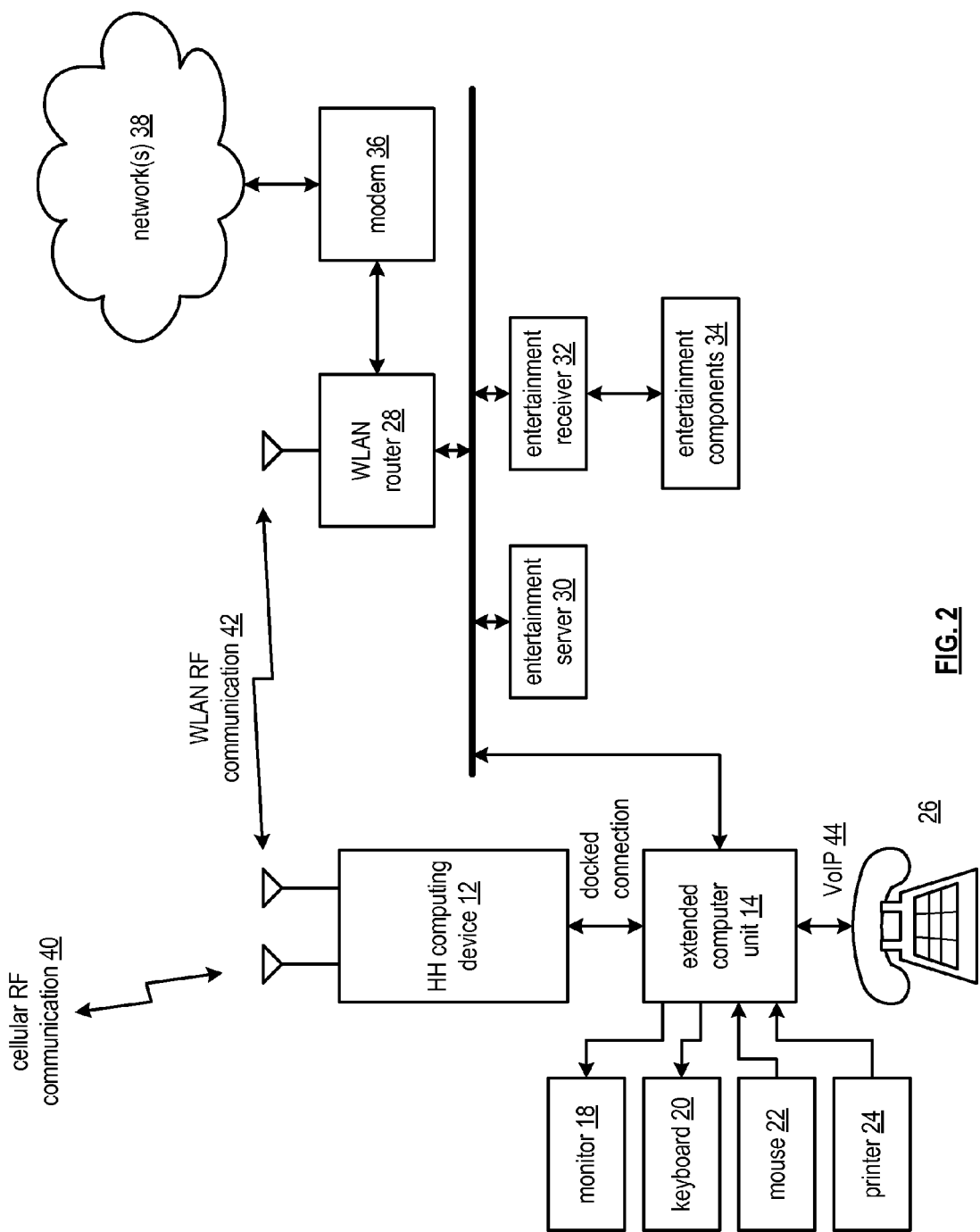
FIG. 2 is a schematic block diagram of an embodiment of a handheld computing unit docked to an extended computing unit within a communication system in accordance with the present invention.

FIG. 2 is a schematic block diagram of an embodiment of a handheld computing unit 12 docked to an extended computing unit 14 within a communication system. In this embodiment, the communication system may include one or more of a wireless local area network (WLAN) router 28, a modem 36 coupled to one or more networks 38 (e.g., internet, public switched telephone network, other WLANs, wide area networks, etc.), an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer. For example, for in-home or in-office use, having the extended computing unit with a form factor similar to a PC may be desirable. As another example, for traveling users, it may be more desirable to have a laptop form factor.

In this example, the handheld computing unit 12 is docked to the extended computer unit 14 and function together to provide the computing device 10. The docking of the handheld computing unit 12 to the extended computing unit 14 encompasses one or more high speed connections between the units 12 and 14. Such a high speed connection may be provided by an electrical connector, by an RF connector, by an electromagnetic connector, and/or a combination thereof. In this mode, the handheld computing unit 12 and the extended computing 14 collectively function similarly to a personal computer and/or laptop computer with a WLAN card and a cellular telephone card.

In this mode, the handheld computing unit 12 may transceive cellular RF communications 40 (e.g., voice and/or data communications). Outgoing voice signals may originate at the VoIP phone 26 as part of a VoIP communication 44 or a microphone coupled to the extended computing unit 14. The outgoing voice signals are converted into digital signals that are subsequently converted to outbound RF signals. Inbound RF signals are converted into incoming digital audio signals and that may be provided to a sound card within the extended computing unit for presentation on speakers or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

In addition, the handheld computing unit 12 may provide a WLAN transceiver for coupling to the WLAN router 28 to support WLAN RF communications 42 for the computing device 10. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the computing device 10 (i.e., the handheld computing unit 12 and the extended computing unit 14) may use the WLAN communications 42 to retrieve and/or store music and/or video files on the entertainment server; and/or to access one or more of the entertainment components 34 and/or the entertainment receiver 32.

Figure 3:
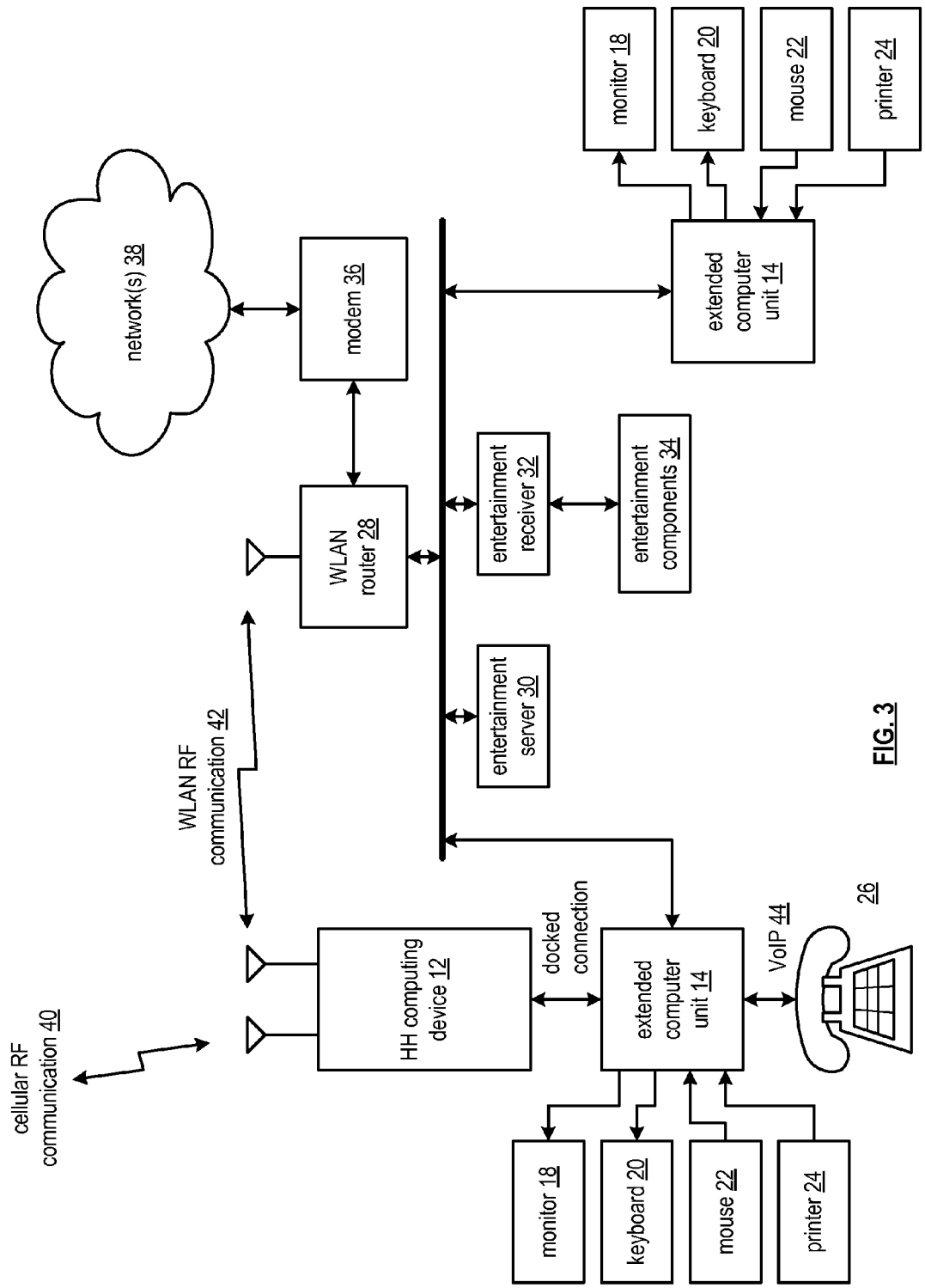
FIG. 3 is a schematic block diagram of an embodiment of a handheld computing unit coupled to multiple extended computing units in accordance with the present invention.

FIG. 3 is a schematic block diagram of an embodiment of a handheld computing unit 12 coupled to multiple extended computing units 14 within a communication system. The communication system includes components similar to the ones discussed with reference to FIG. 2. In addition, each of the extended computing units 14 is coupled to a monitor 18, a keyboard, a mouse 22, and a printer 24 and may also be coupled to other devices (not shown) such as a trackball, touch screen, gaming devices (e.g., joystick, game pad, game controller, etc.), an image scanner, a webcam, a microphone, speakers, and/or a headset.

In this example, the handheld computing unit 12 is docked to one of the extended computer units 14 and coupled to another one of the extended computing units 14 via the WLAN. The combination of the handheld computing unit 12 and the extended computing units 14 function as a single computing device 10. While functioning as a single computing device 10, the handheld computing unit 12 may transceive cellular RF communications 40 (e.g., voice and/or data communications). Outgoing voice signals may originate at the VoIP phone 26 as part of a VoIP communication 44, via a microphone or headset coupled to handheld computing unit 12, and/or a microphone or headset coupled to one or more of the extended computing units 14. The outgoing voice signals are converted into digital signals that are subsequently converted to outbound RF signals. Inbound RF signals are converted into incoming digital audio signals and may be provided to a sound card within one of the extended computing units 14 for presentation on speakers, provided to a speaker or the headset coupled to the handheld computing unit, and/or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

As an example of use of the computing device 10 in this configuration, a user may have two extended computing units with his/her home or office. One of the extended computing units may be directly affiliated with his/her handheld computing unit (e.g., the one the handheld computing unit is directly docked to) and the other may be affiliated with a family member's handheld computing unit. In this instance, the hardware, operating system, and application software of the handheld computing unit and the extended computing units are integrated or are configured in a primary-secondary manner (as will be discussed below) to provide the functionality of the computing device 10. In this mode, the user can select which extended computing will provide the user interfaces (e.g., which monitor to use, which keyboard, etc.) or it may be configured in accordance with a default protocol.

Figure 4:
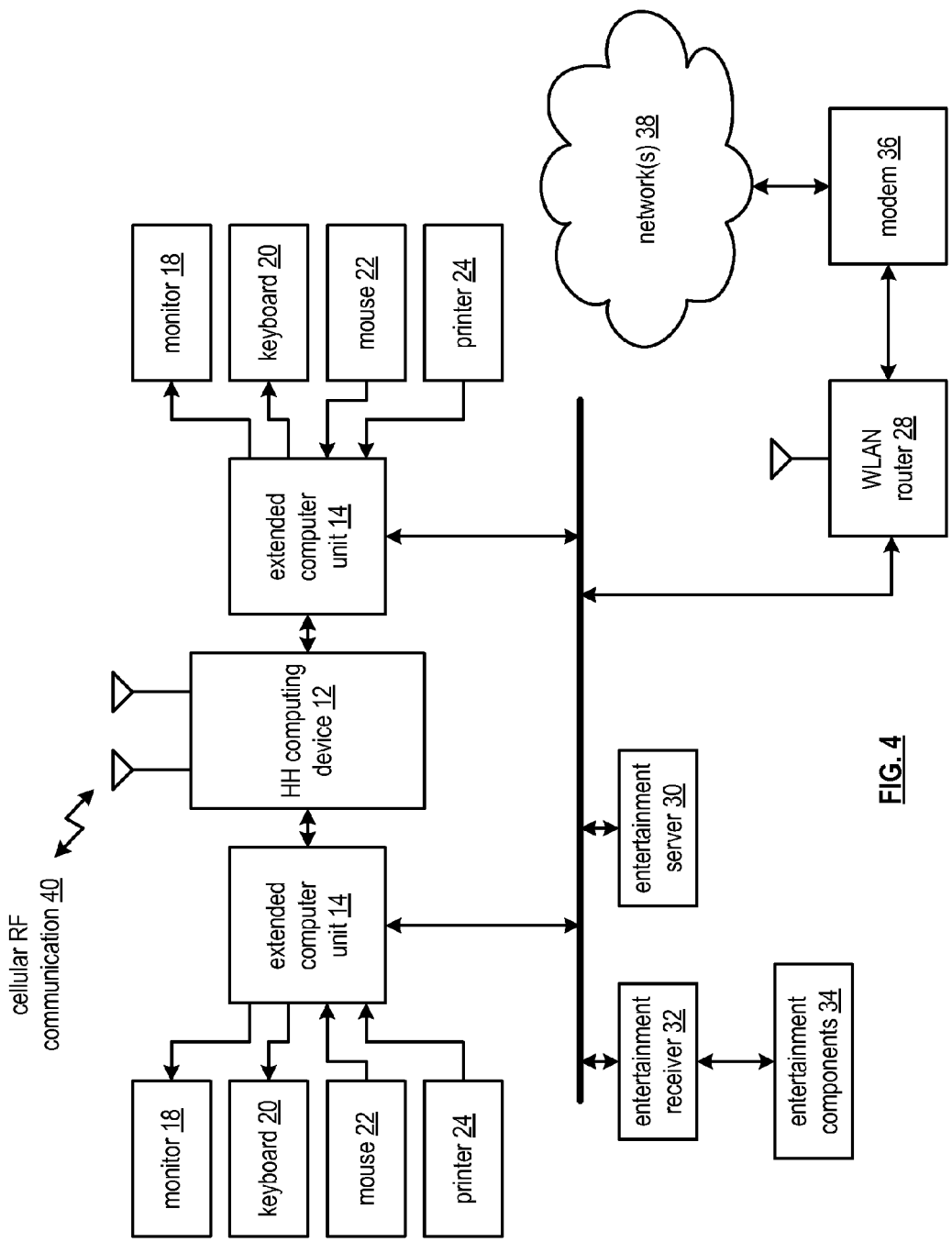
FIG. 4 is a schematic block diagram of another embodiment of a handheld computing unit coupled to multiple extended computing units in accordance with the present invention.

FIG. 4 is a schematic block diagram of another embodiment of a handheld computing unit 12 coupled to multiple extended computing units 14 within a communication system. The communication system includes components similar to the ones discussed with reference to FIG. 2. In addition, each of the extended computing units 14 is coupled to a monitor 18, a keyboard, a mouse 22, and a printer 24 and may also be coupled to other devices (not shown) such as a trackball, touch screen, gaming devices (e.g., joystick, game pad, game controller, etc.), an image scanner, a webcam, a microphone, speakers, and/or a headset.

In this example, the handheld computing unit 12 is docked to both of the extended computer units 14. The combination of the handheld computing unit 12 and the extended computing units function as a single computing device 10. While functioning as a single computing device 10, the handheld computing unit 12 may transceive cellular RF communications 40 (e.g., voice and/or data communications) as previously described.

As an example of use of the computing device 10 in this configuration, a user may have two extended computing units with his/her home or office. One of the extended computing units may be directly affiliated with his/her handheld computing unit (e.g., the one the handheld computing unit is directly docked to) and the other may be affiliated with a family member's handheld computing unit. Alternatively, both extended computing units may be affiliated with the user's handheld computing unit. In either case, the hardware, operating system, and application software of the handheld computing unit and the extended computing units are integrated or are configured in a primary-secondary manner to provide the functionality of the computing device 10. In this mode, the user can select which extended computing will provide the user interfaces (e.g., which monitor to use, which keyboard, etc.) or it may be configured in accordance with a default protocol. Note that only one of the extended computing units 14 may have user interface components (e.g., keyboard, mouse, etc.).

Figure 5:
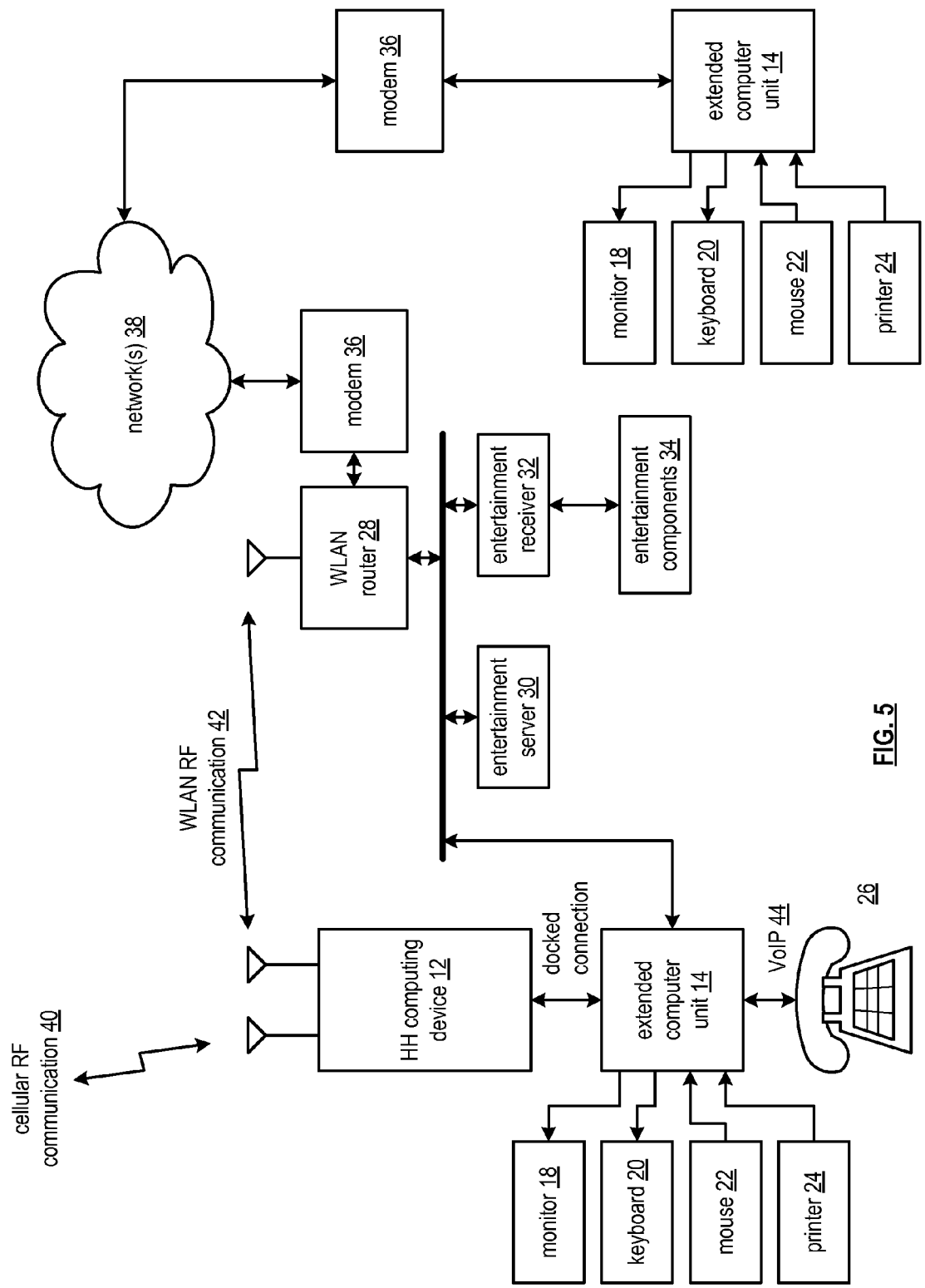
FIG. 5 is a schematic block diagram of another embodiment of a handheld computing unit coupled to multiple extended computing units in accordance with the present invention.

FIG. 5 is a schematic block diagram of another embodiment of a handheld computing unit 12 coupled to multiple extended computing units 14 within a communication system. The communication system includes components similar to the ones discussed with reference to FIG. 2. In this example, the handheld computing unit 12 is docked to one of the extended computer units 14 and coupled to another one of the extended computing units 14 via the network(s) 38. The combination of the handheld computing unit 12 and the extended computing units function as a single computing device 10. While functioning as a single computing device 10, the handheld computing unit 12 may transceive cellular RF communications 40 (e.g., voice and/or data communications) as previously described.

As an example of use of the computing device 10 in this configuration, a user may have two extended computing units: one at his/her home and the other at his/her office. In this instance, the hardware, operating system, and application software of the handheld computing unit and the extended computing units are integrated or are configured in a primary-secondary manner (as will be discussed below) to provide the functionality of the computing device 10.

Figure 6:
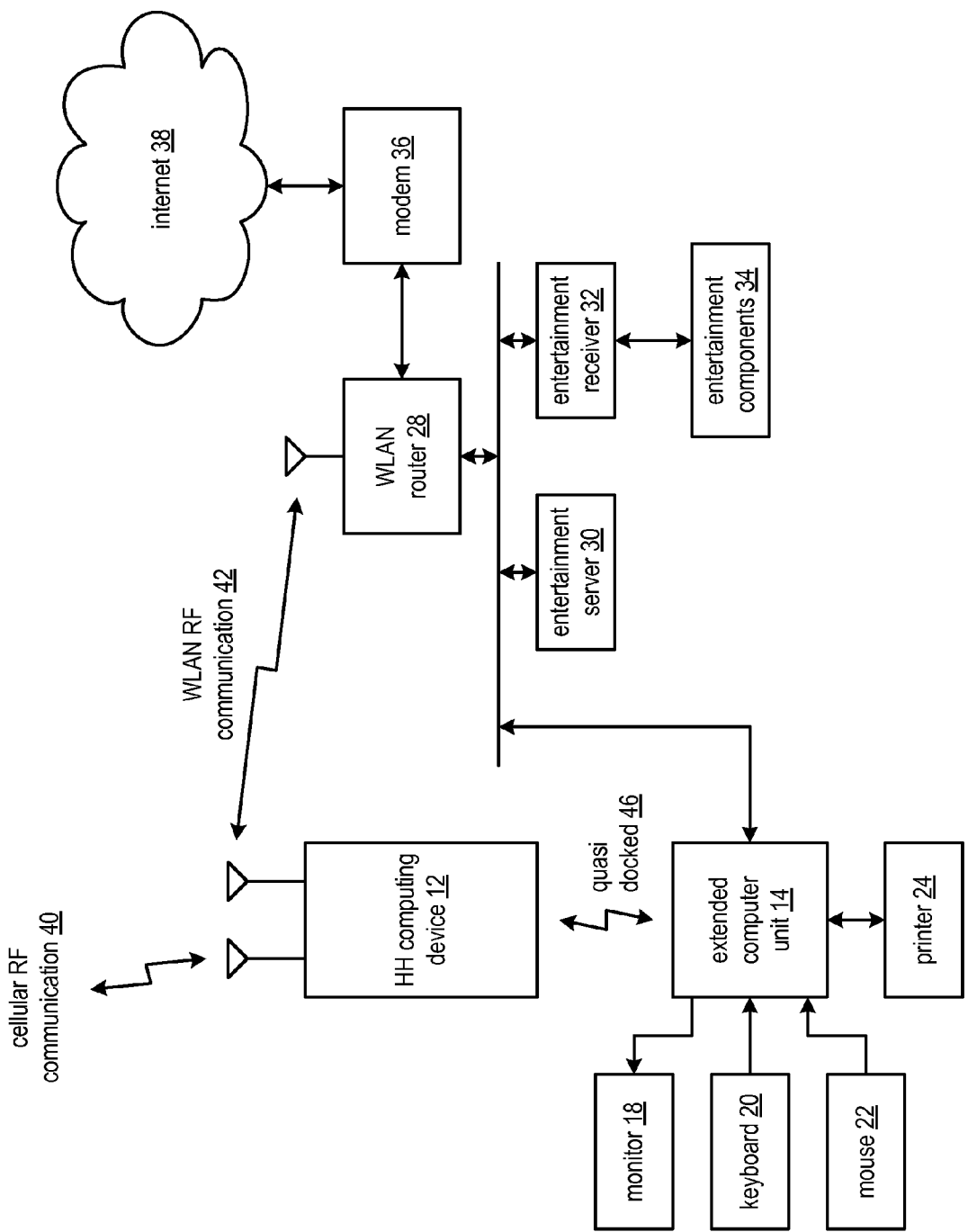
FIG. 6 is a schematic block diagram of an embodiment of a handheld computing unit quasi docked to an extended computing unit within a communication system in accordance with the present invention.

FIG. 6 is a schematic block diagram of an embodiment of a handheld computing unit 12 quasi docked to an extended computing unit 14 within a communication system, which may include the components as previously discussed with reference to FIG. 2. In this example, the handheld computing unit 12 is quasi docked 46 to the extended computer unit 14, where the handheld computing unit 12 functions as a stand-alone computer with its own resources (e.g., processing modules, user inputs/outputs, main memory, etc. of the handheld computing unit) and limited access to the memory of the extended computing unit 14.

The quasi docking 46 of the handheld computing unit 12 to the extended computing unit 14 is provided by an RF communication, where an RF transceiver of the handheld computing unit 12 is communicating with an RF transceiver of the extended computing unit 14. Depending on the bit rate of the RF connection, the handheld computing unit can access files and/or applications stored in memory of the extended computing unit 14. In addition, the handheld computing unit 12 may direct the processing module of the extended computing unit 14 to perform a remote co-processing function, but the processing module of the handheld computing unit and the extended computing unit do not function as a multiprocessing module as they do when in the integrated and/or primary-secondary docked mode.

As an alternative, the quasi docked mode may be achieved by the handheld computing unit 12 communicating with the extended computing unit via the WLAN communication 42 and the WLAN router 28. As yet another example, the quasi docked mode may be achieved via a data cellular RF communication 40 via the internet 38 to the extended computing unit 14.

In this mode, the handheld computing unit 12 may transceive cellular RF communications 40 (e.g., voice and/or data communications). In addition, the handheld computing unit 12 may provide a WLAN transceiver for coupling to the WLAN router 28 to support WLAN RF communications 42 with the WLAN router 28. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the the handheld computing unit 12 may use the WLAN communications 42 to retrieve and/or store music and/or video files on the entertainment server; and/or to access one or more of the entertainment components 34 and/or the entertainment receiver 32.

Figure 7:
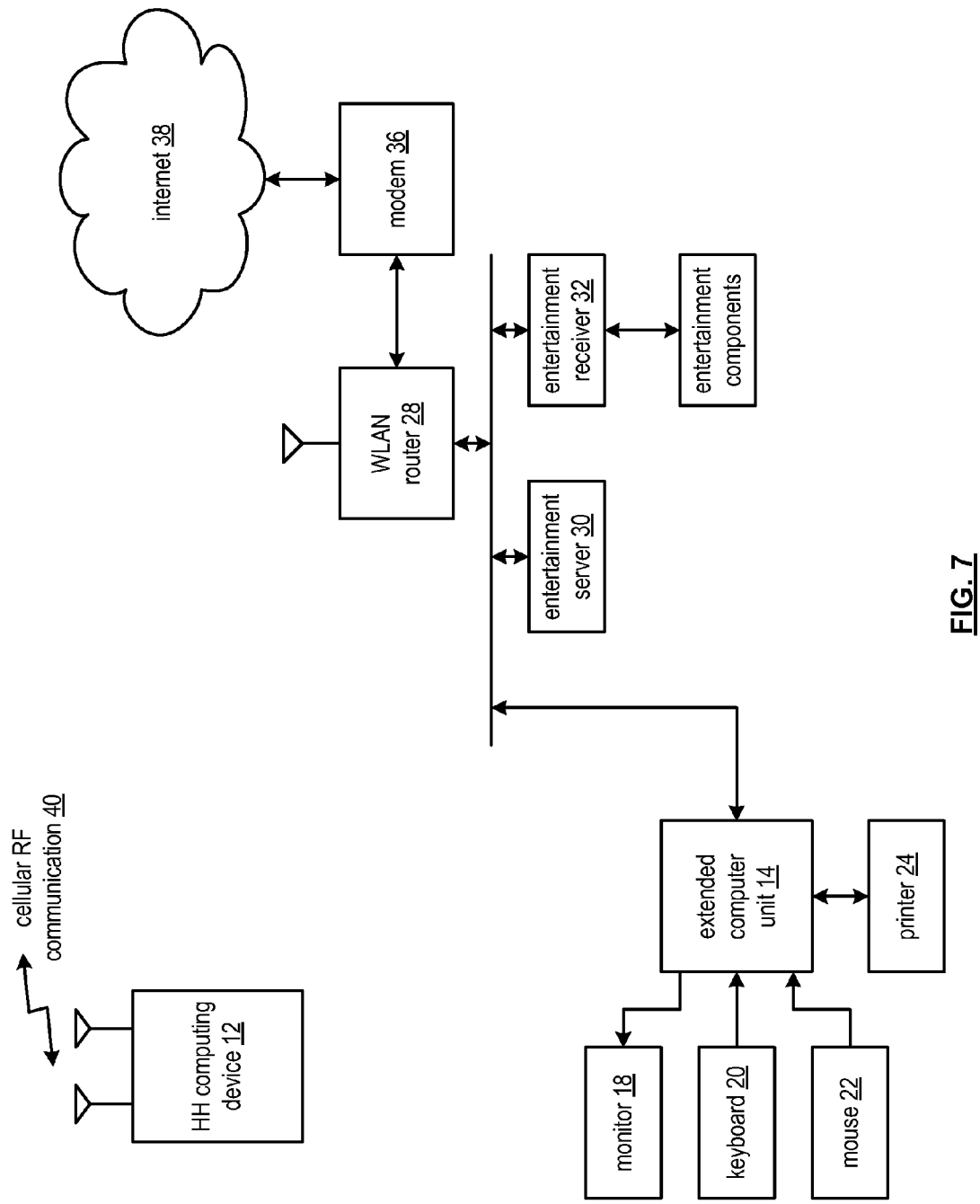
FIG. 7 is a schematic block diagram of an embodiment of a handheld computing unit in a remote mode with respect to an extended computing unit within a communication system in accordance with the present invention.

FIG. 7 is a schematic block diagram of an embodiment of a handheld computing unit 12 in a remote mode with respect to an extended computing unit 14. In this mode, the handheld computing unit 12 has no communications with the extended computing unit 14. As such, the extended computing unit 14 is substantially disabled and the handheld computing unit 12 functions as a stand-alone computing device.

Figure 8:
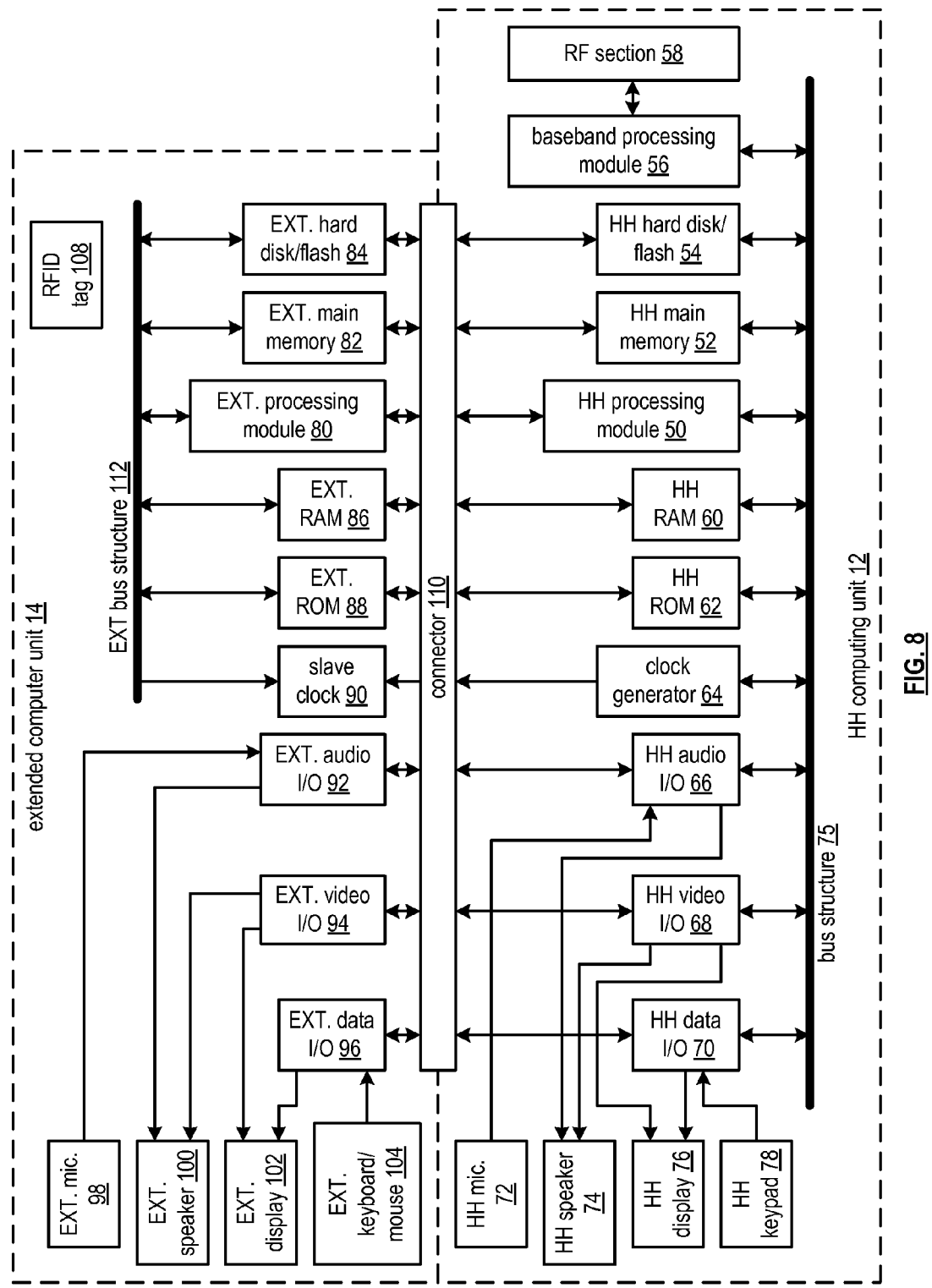
FIG. 8 is a schematic block diagram of an embodiment of a handheld computing unit docked to an extended computing unit in accordance with the present invention.

FIG. 8 is a schematic block diagram of an embodiment of a handheld computing unit 12 docked to an extended computing unit 14. The handheld computing unit 12 includes a handheld processing module 50, handheld main memory 52, handheld hard disk/flash memory 54, a baseband processing module 56, a radio frequency (RF) section 58, handheld random access memory (RAM) 60, handheld read only memory (ROM) 62, a clock generator circuit 64, handheld input/output (I/O) interfaces (e.g., handheld audio I/O interface 66, handheld video and/or graphics interface 68, and handheld data I/O interface 70), and handheld I/O components (e.g., handheld microphone 72, handheld speaker 74, handheld display 76, and a handheld keypad and/or touch screen 78), a handheld bus structure 75, and a handheld connection structure 110.

The extended computing unit 14 includes an extended processing module 80, extended main memory 82, extended hard disk/flash memory 84, extended random access memory (RAM) 86, extended read only memory (ROM) 88, a slave clock circuit 90, extended input/output (I/O) interfaces (e.g., extended audio I/O interface 92, extended video and/or graphics interface 94, and an extended data I/O interface 96), and extended I/O components (e.g., extended microphone 98, extended speaker 100, extended display 102—which may be monitor 18 and/or printer 24—, and an extended keyboard/mouse 104, which may be keyboard 20 and mouse 22), an extended connection structure 110, an extended bus structure 112, and a radio frequency identification (RFID) tag 108.

Within the handheld computing unit 12, the processing module 50 and the baseband processing module 56 may be separate processing modules or the same processing module. Such a processing module may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-30.

Also within the handheld computing unit 12, the handheld main memory 52 includes one or more RAM integrated circuits (IC) and/or boards. The RAM may be static RAM (SRAM) and/or dynamic RAM (DRAM). The handheld hard disk/flash memory 54 may be one or more of a hard disk, a floppy disk, an optical disk, NOR flash memory, NAND flash memory, and/or any other type of non-volatile memory. The clock generator circuit 64 may be one or more of: a phase locked loop, a crystal oscillator circuit, a fractional-N synthesizer, and/or a resonator circuit-amplifier circuit, where the resonator may be a quartz piezo-electric oscillator, a tank circuit, or a resistor-capacitor circuit. Regardless of the implementation of the clock generator circuit 64, it generates a master clock signal that is provided to the slave clock circuit 90 and generates the clock signals for the handheld computing unit 12. Such clock signals include, but are not limited to, a bus clock, a read/write clock, a processing module clock, a local oscillation, and an I/O clock.

The handheld ROM 62 stores the basic input/output system (BIOS) program for the computing device 10 (i.e., the handheld computing unit 12 and the extended computing unit 14). The ROM 62 may be one or more of an electronically erasable programmable ROM (EEPROM), a programmable ROM (PROM), and/or a flash ROM.

As used herein, an interface includes hardware and/or software for a device coupled thereto to access the bus of the handheld computing unit and/or of the extended computing unit. For example, the interface software may include a driver associated with the device and the hardware may include a signal conversion circuit, a level shifter, etc. Within the handheld computing unit, the handheld audio I/O interface 66 may include an audio codec, a volume control circuit, and/or a microphone bias and/or amplifier circuit to couple the handheld (HH) microphone 72 and/or the HH speaker 74 to the HH bus structure 75. The HH video I/O interface 68 may include a video codec, a graphics engine, a display driver, etc. to couple the HH display to the HH bus structure 75. The HH data I/O interface 70 may include the graphics engine, a display driver, a keypad driver, a touch screen driver, etc. to coupled the HH display 76 and/or the HH keypad 78 to the HH bus structure 75.

Within the extended computing unit 14, the extended (EXT) processing module 80 may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-30.

Also within the extended computing unit 14, the EXT main memory 86 includes one or more RAM integrated circuits (IC) and/or boards. The RAM may be static RAM (SRAM) and/or dynamic RAM (DRAM). Note that the EXT main memory 86 and the EXT RAM 86 may be omitted if the handheld computing unit contains a sufficient amount of main memory. The EXT hard disk/flash memory 84 may be one or more of a hard disk, a floppy disk, at tape drive, an optical disk, NOR flash memory, NAND flash memory, and/or any other type of non-volatile memory. The slave clock circuit 90 may be a phase locked loop (PLL), clock divider, and/or clock multiplier that receives the master clock signal and produces therefrom the clock signals for the extended computing unit 14. Such clock signals include, but are not limited to, a bus clock, a read/write clock, a processing module clock, and an I/O clock.

The EXT ROM 88 may be one or more of an electronically erasable programmable ROM (EEPROM), a programmable ROM (PROM), and/or a flash ROM. Note that the EXT ROM 88 may be omitted if the HH ROM 62 is of sufficient size to accommodate the BIOS program and other system data that is stored in non-volatile memory.

The EXT audio I/O interface 92 may include a sound card and corresponding driver to couple the EXT microphone 98 and/or the EXT speaker 100 to the HH and/or EXT bus structure 75 and/or 112. The EXT video I/O interface 94 may include a video codec, a graphics card, a graphics control unit, a display driver, etc. to couple the EXT display 102 (e.g., monitor 18) to the HH and/or EXT bus structure 75 and/or 112. The EXT data I/O interface 98 may include the graphics card, the graphics control unit, a display driver, a keyboard and mouse driver(s), a touch screen driver, etc. to coupled the EXT display 104 and/or the EXT keyboard/mouse 104 to the HH and/or EXT bus structure 75 and/or 112.

The RFID tag 108 provides an RF communication link to the handheld computing unit 12 when the extended computing unit 14 is disabled. The WID tag 108 may be implemented as disclosed in patent application entitled POWER GENERATING CIRCUIT, having a serial number of 11/394,808, and a filing date of Mar. 31, 2006, issued as U.S. Pat. No. 7,595,732, on Sep. 29, 2009. Communication with the RFID tag 108 will be described in greater detail with reference to FIGS. 23-25.

When the computing device 10 is active in a wireless transmission, the baseband processing module 56 and the RF section 58 are active. For example, for cellular voice communications, the baseband processing module 56 converts an outbound voice signal into an outbound voice symbol stream in accordance with one or more existing wireless communication standards, new wireless communication standards, modifications thereof, and/or extensions thereof (e.g., GSM, AMPS, digital AMPS, CDMA, etc.). The baseband processing module 56 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal into the outbound voice symbol stream. Depending on the desired formatting of the outbound voice symbol stream, the baseband processing module 56 may generate the outbound voice symbol stream as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in patent application entitled HYBRID RADIO FREQUENCY TRANSMITTER, having a filing date of Mar. 24, 2006, and an application Ser. No. of 11/388,822, issued as U.S. Pat. No. 7,787,547, on Aug. 31, 2010, and patent application entitled PROGRAMMABLE HYBRID TRANSMITTER, having a filing date of Jul. 26, 2006, and an application Ser. No. of 11/494,682, now issued as U.S. Pat. No. 7,852,970, on Dec. 14, 2010.

The RF section 58 converts the outbound voice symbol stream into an outbound RF voice signal in accordance with the one or more existing wireless communication standards, new wireless communication standards, modifications thereof, and/or extensions thereof (e.g., GSM, AMPS, digital AMPS, CDMA, etc.). In one embodiment, the RF section 58 receives the outbound voice symbol stream as Cartesian coordinates. In this embodiment, the RF section 58 mixes the in-phase components of the outbound voice symbol stream with an in-phase local oscillation to produce a first mixed signal and mixes the quadrature components of the outbound voice symbol stream to produce a second mixed signal. The RF section 58 combines the first and second mixed signals to produce an up-converted voice signal. The RF section 58 then amplifies the up-converted voice signal to produce the outbound RF voice signal, which it provides to an antenna section. Note that further power amplification may occur between the output of the RF section 58 and the input of the antenna section.

In other embodiments, the RF section 58 receives the outbound voice symbol stream as Polar or hybrid coordinates. In these embodiments, the RF section 58 modulates a local oscillator based on phase information of the outbound voice symbol stream to produce a phase modulated RF signal. The RF section 58 then amplifies the phase modulated RF signal in accordance with amplitude information of the outbound voice symbol stream to produce the outbound RF voice signal. Alternatively, the RF section 58 may amplify the phase modulated RF signal in accordance with a power level setting to produce the outbound RF voice signal.

For incoming voice signals, the RF section 58 receives an inbound RF voice signal via the antenna section. The RF section 58 converts the inbound RF voice signal into an inbound voice symbol stream. In an embodiment, the RF section 58 extracts Cartesian coordinates from the inbound RF voice signal to produce the inbound voice symbol stream. In another embodiment, the RF section 58 extracts Polar coordinates from the inbound RF voice signal to produce the inbound voice symbol stream. In yet another embodiment, the RF section 58 extracts hybrid coordinates from the inbound RF voice signal to produce the inbound voice symbol stream.

The baseband processing module 56 converts the inbound voice symbol stream into an inbound voice signal. The baseband processing module 56 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream into the inbound voice signal, which is placed on the bus structure 75.

The baseband processing module 56 and the RF section function similarly for processing data communications and for processing WLAN communications. For data communications, the baseband processing module 56 and the RF section function in accordance with one or more cellular data protocols such as, but not limited to, Enhanced Data rates for GSM Evolution (EDGE), General Packet Radio Service (GPRS), high-speed downlink packet access (HSDPA), high-speed uplink packet access (HSUPA), newer version thereof, and/or replacements thereof. For WLAN communications, the baseband processing module 56 and the RF section 58 function in accordance with one or more wireless communication protocols such as, but not limited to, IEEE 802.11(a), (b), (g), (n), etc., Bluetooth, ZigBee, RFID, etc.

When the computing device 10 is executing one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.), the HH processing module 50 and the EXT processing module 80 function as a multiprocessing module and the HH and EXT main memories 52 and 82 function as combined main memory. In addition, the HH hard disk/flash memory 54 and the EXT hard disk/flash memory 84 function as a combined hard disk/flash memory.

For instance, the multiprocessing module provides mmultiprocessing via the HH and EXT processing modules 50 and 80. In this configuration, the processing modules 50 and 80 may share tasks and/or execute multiple concurrent software processes. Further, the processing modules 50 and 80 may be equal; one may be reserved for one or more special purposes; may be tightly coupled; may be loosely coupled; etc. For example, at the operating system level, the HH processing module 50 may be designated to respond to all interrupts, traps, and/or services calls and the invoke the EXT processing module 80 as needed. As another example, at the user level, the processing modules may function in a symmetrical multiprocessing mode, in an asymmetrical multiprocessing mode, in a non-uniform memory access multiprocessing mode, and/or in a clustered multiprocessing mode.

With respect to instruction and data streams, the processing modules 50 and 80 may execute a single sequence of instructions in multiple contexts (single-instruction, multiple-data or SIMD), multiple sequences of instructions in a single context (multiple-instruction, single-data or MISD), or multiple sequences of instructions in multiple contexts (multiple-instruction, multiple-data or MIMD).

The computing device 10 incorporates a virtual memory technique, overlays, and/or swapping to utilize the combined main memories and hard disk/flash memories for one or more user applications. In an embodiment, the virtual memory is divided the virtual address space into pages (e.g., a 4K-Byte block), where one or more page tables (e.g., one for the computing device, one for each running user application, etc.) translates the virtual address into a physical address. Note that the memory controller manages accesses to the one or more page tables to facilitate the fetching of data and/or instructions from physical memory. If a page table indicates that a page is not currently in memory, the memory controller and/or one of the processing modules 50 and/or 80 raise a page fault interrupt.

A paging supervisor of the operating system receives the page fault interrupt and, in response, searches for the desired page containing the required virtual address. Once found, the paging supervisor reads the page into main memory and updates the appropriate page table. If there is insufficient room the main memory, the paging supervisor saves an area of the main memory to the HH or EXT hard disk/flash memory and update the corresponding page table. The cleared area of main memory is then used for the new page.

With respect to user I/O devices, the HH microphone 72, the HH speaker 74, the HH display 76 and the HH keypad 78 may be disabled while the handheld computing unit is docked. In this mode, the EXT microphone 98, the EXT speaker 100, the EXT display 102, and the EXT keyboard/mouse 104 are active to provide the user interfaces to the computing device 10. Note that for a cellular voice telephone call, the inbound and outbound voice signals may be provided to/from the EXT microphone 98 and the speaker 100, an EXT headset (not shown), or the VoIP phone 46.

Figure 9:
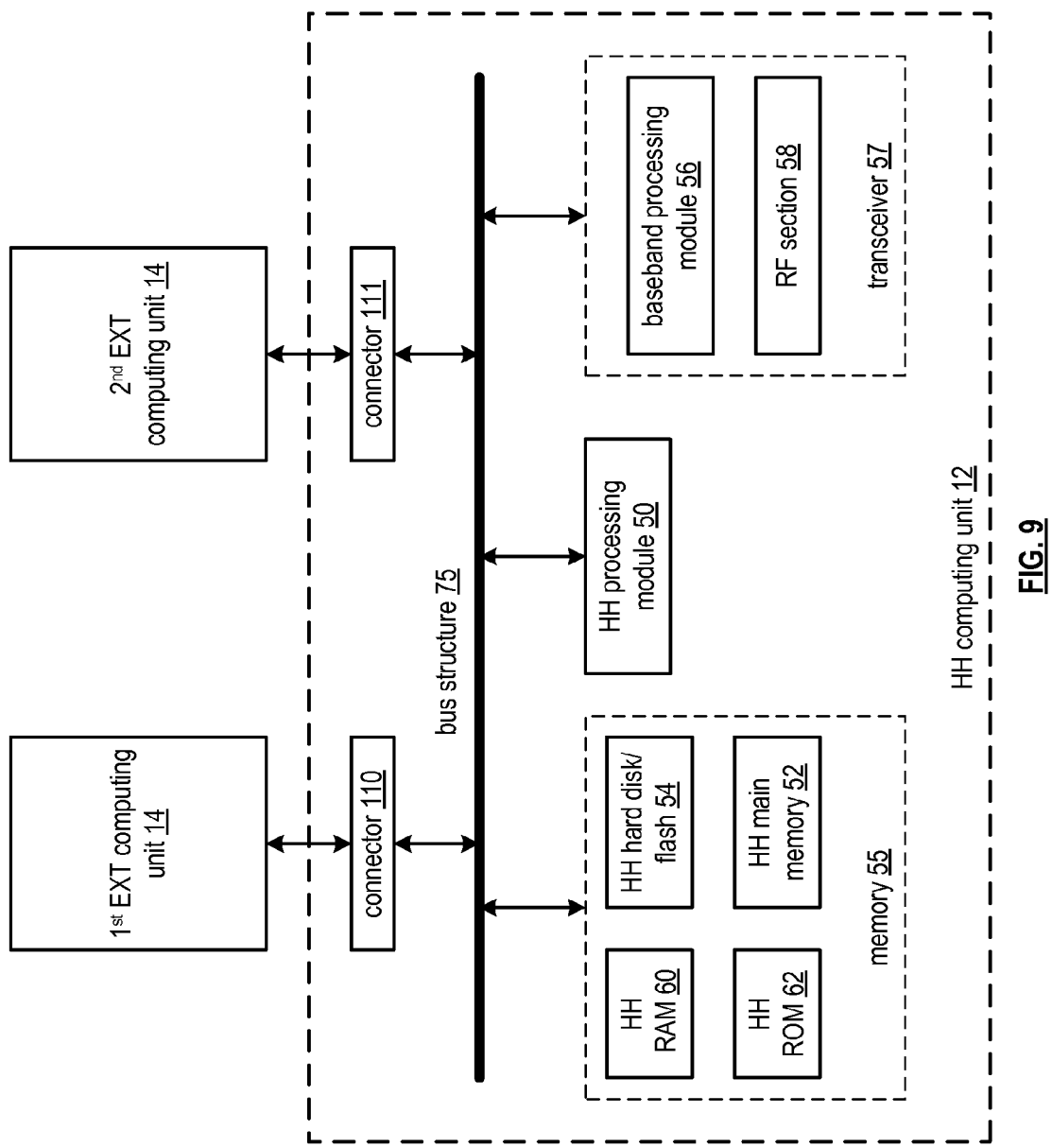
FIG. 9 is a schematic block diagram of an embodiment of a handheld computing unit docked to multiple extended computing units in accordance with the present invention.

FIG. 9 is a schematic block diagram of an embodiment of a handheld computing unit 12 coupled to multiple extended computing units 14 to support the configurations discussed with reference to FIGS. 3-5. In this embodiment, the HH computing unit 12 includes similar components as discussed in FIG. 8 with the inclusion of an additional connector 111. However, for ease of discuss, the HH computing unit 12 is shown to include the connectors 110 and 111, the bus structure 75 (which provides at least part of an interconnection structure), memory 55 (e.g., HH RAM 60, HH hard disk/flash 54, HH ROM 62, and HH main memory 52), the HH processing module 50, and a transceiver 57 (e.g., the baseband processing module 56 and the RF section 58).

The connectors 110 and 111 function as interfaces with the extended computing units, where connector 110 couples the HH computing unit 12 to the first EXT computing unit 14 and connector 111 couples the HH computing unit to the second EXT computing unit 14. The connectors 110 and 111 may be hard-wired connections (e.g., electrical connectors), may be firmware to support dedicated local wireless links, may be firmware to support shared local wireless link, and/or may be firmware to support a shared wide area wireless link.

The handheld computing unit 12 may include one or more integrated circuits. For example, one or more integrated circuits may be used to implement the processing module, the memory, the transceiver, and the interconnection structure. As another example, the one or more integrated circuits may be used to implement the processing module, the memory, the transceiver, the interconnection structure, and at least one of the first and second extended computing unit interfaces.

In another embodiment, the handheld computing unit includes the processing module 50, the memory 55, the transceiver 57, the first extended computing unit interface (e.g., connector 110), a second extended computing unit interface (e.g., connector 111), and an interconnection structure (e.g., bus structure 75) operably coupled to the processing module, the memory, the transceiver, and the first and second extended computing unit interfaces. At start up, the handheld computing unit is operable to determine the mode of the handheld computing unit. When the handheld computing unit is in an integrated multiple extended unit mode, the HH unit executes an integrated multiple extended unit operating system boot loader. Alternatively, when the handheld computing unit is in a primary-second multiple extended unit mode, the HH unit executes a primary-secondary multiple extended unit operating system boot loader. This will be discussed in greater detail below.

Figure 10:
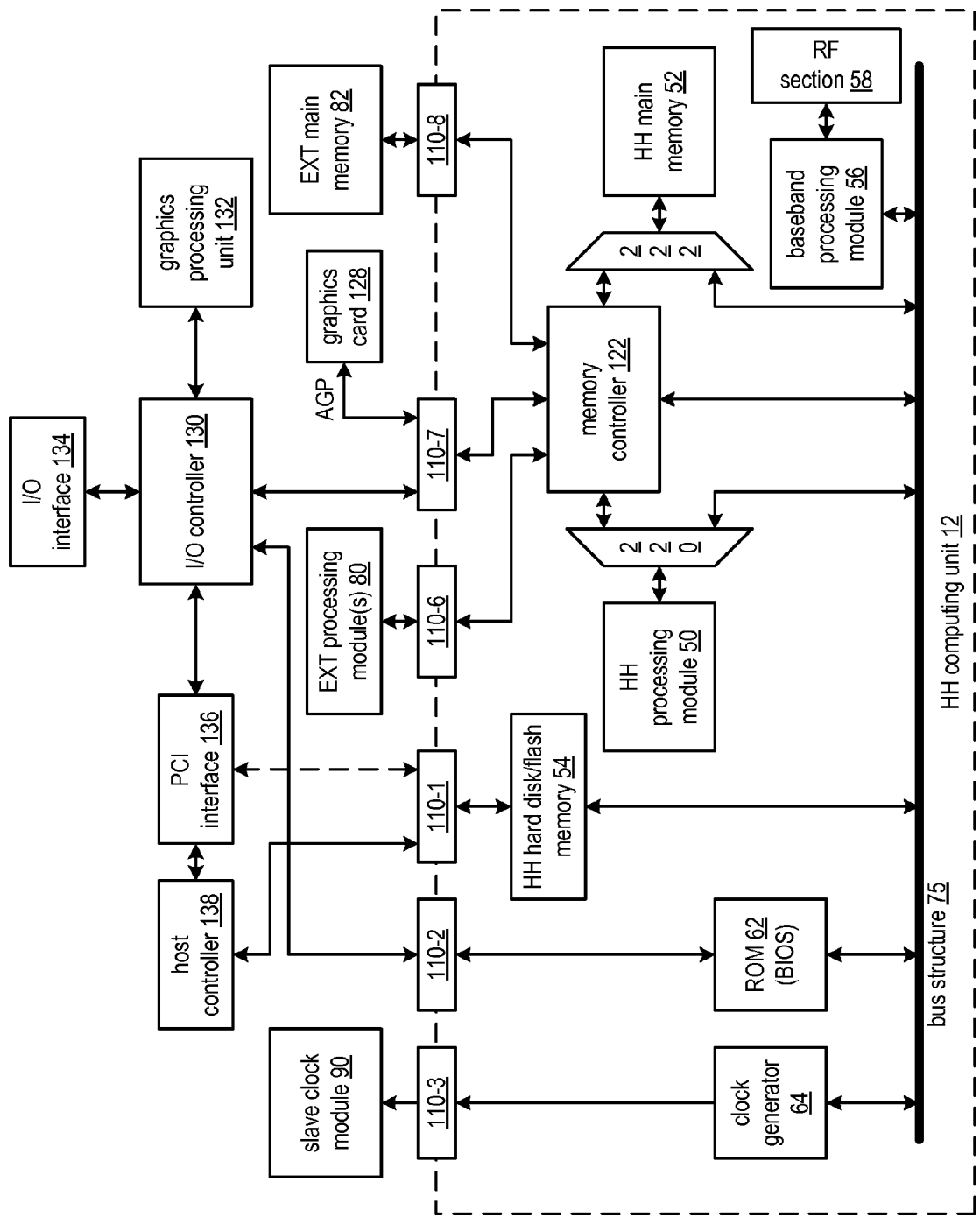
FIG. 10 is a schematic block diagram of another embodiment of a handheld computing unit docked to an extended computing unit in accordance with the present invention.

FIG. 10 is a schematic block diagram of another embodiment of core components of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110A, which may be individual connections 110-1 through 110-8, the memory controller 122, and optional demultiplexers 220 and 222. The core components of the extended computing unit 14 include the corresponding connection structure 110B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 14-30, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-6 through 110-8. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

If the demultiplexers 220 and 222 are included, the memory controller 122 is coupled to the HH processing module 50 via demultiplexer 220 and is coupled to the HH main memory 52 via demultiplexer 222 when the handheld computing unit 12 is in the docked mode. When the handheld computing unit 12 is in the remote mode, the memory controller 122 may be deactivated such that the demultiplexers 220 and 222 couple the HH processing module 50 and the HH main memory 52 to the HH bus structure 75. If the demultiplexers 220 and 222 are not included, the memory controller 122 is on in both the docked and remote modes to coordinate reading from and writing to the HH main memory 52.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 11:
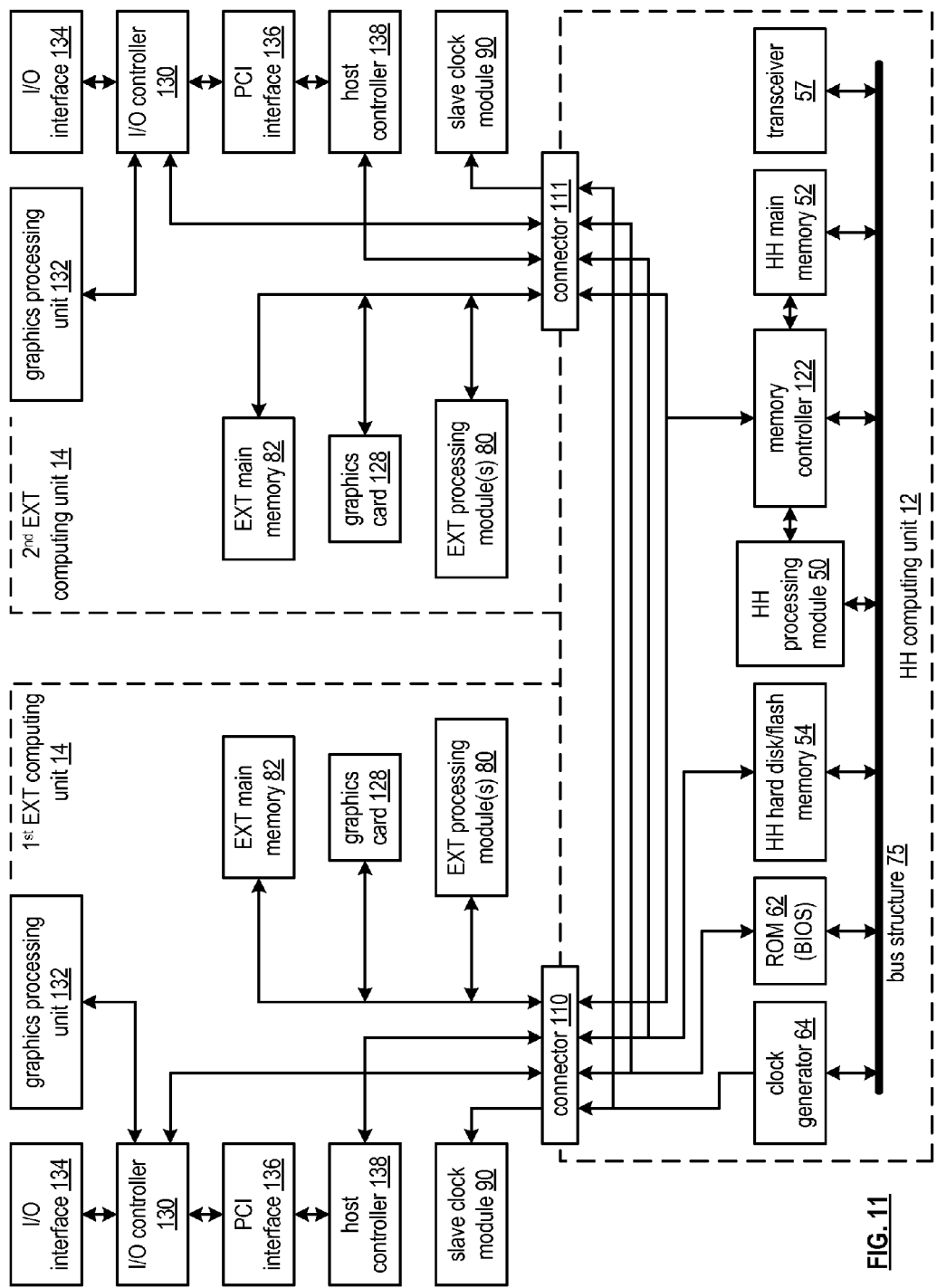
FIG. 11 is a schematic block diagram of another embodiment of a handheld computing unit docked to multiple extended computing units in accordance with the present invention.

FIG. 11 is a schematic block diagram of another embodiment of a handheld computing unit 12 docked to multiple extended computing units 14. The core components of the handheld computing unit 12 include the HH processing module 50, the HH main memory 52, the HH hard disk/flash memory 54, the baseband processing module 56, the RF section 58, the ROM 62, the handheld connection structure 110A and 111A (which may be individual connections 110-1 through 110-8) the memory controller 122, and optional demultiplexers 220 and 222. The core components of each of the extended computing units 14 include the corresponding connection structure 110B and 111B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

In this embodiment, when the handheld computing unit is in an integrated mode, the memory controller 122 configures the memory and memory of the first and second extended computing units as computing device memory. When the handheld computing unit is in a primary-secondary mode, the memory controller configures the memory and the memory of the first extended computing unit as the computing device memory and identifies the memory of the second extended computing unit as secondary memory or off-line memory.

Figure 12:
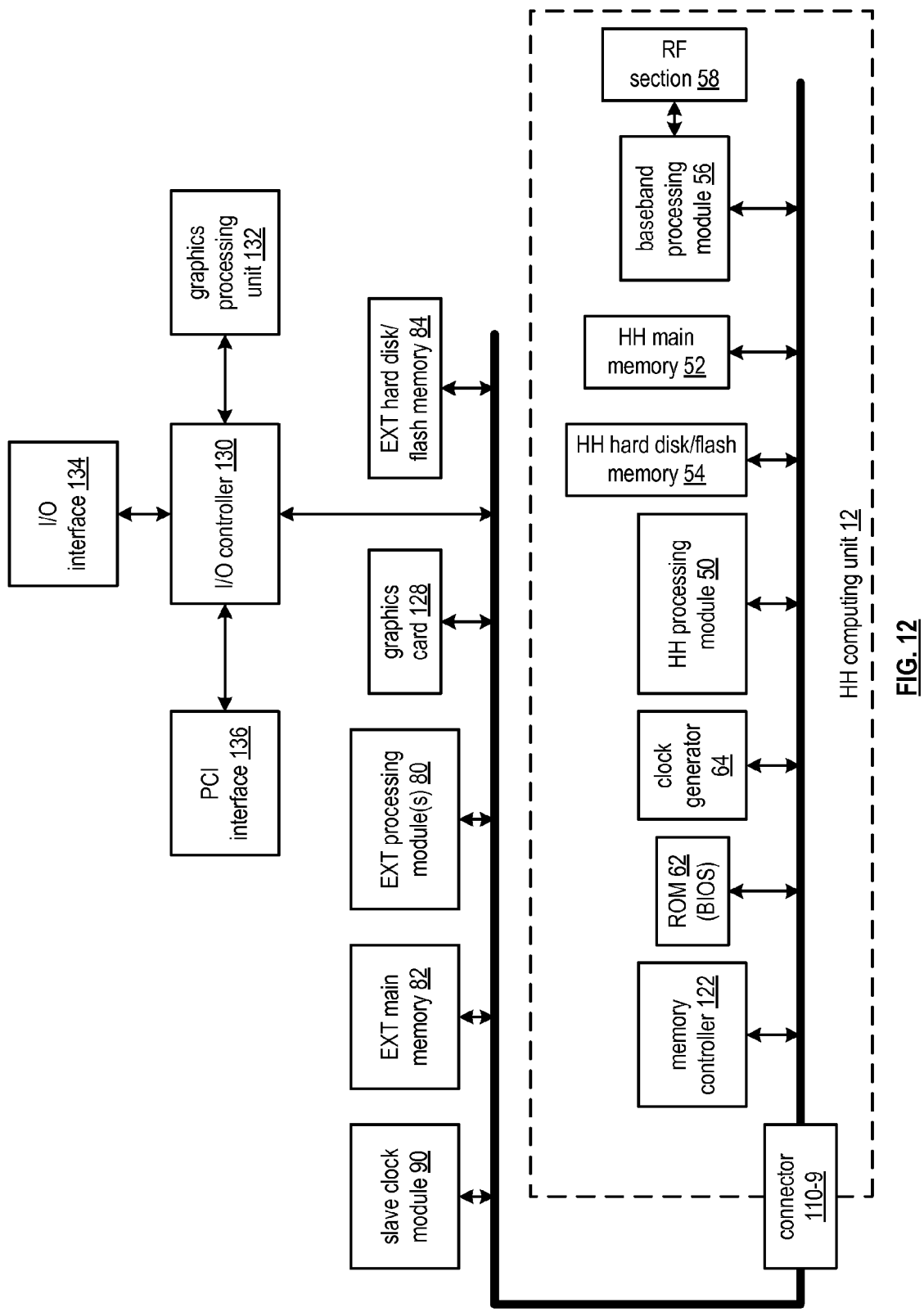
FIG. 12 is a schematic block diagram of another embodiment of a handheld computing unit docked to an extended computing unit in accordance with the present invention.

FIG. 12 is a schematic block diagram of another embodiment of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110-9A, and the memory controller 122. The core components of the extended computing unit 14 include the corresponding connection structure 110-9B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 14-30, the computing device 10 is ready to execute a user application.

In an embodiment, the memory controller 122 is within the handheld computing unit 12 and is coupled to the I/O controller 130, the graphics card 128, the EXT processing module 80, and the EXT main memory of each EXT computing unit via the connector structures 110 and 111. When connected, the memory controller 122 coordinates the reading data from and writing data to the HH main memory 52 and the EXT main memories 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

Within each of the extended computing units, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 13:
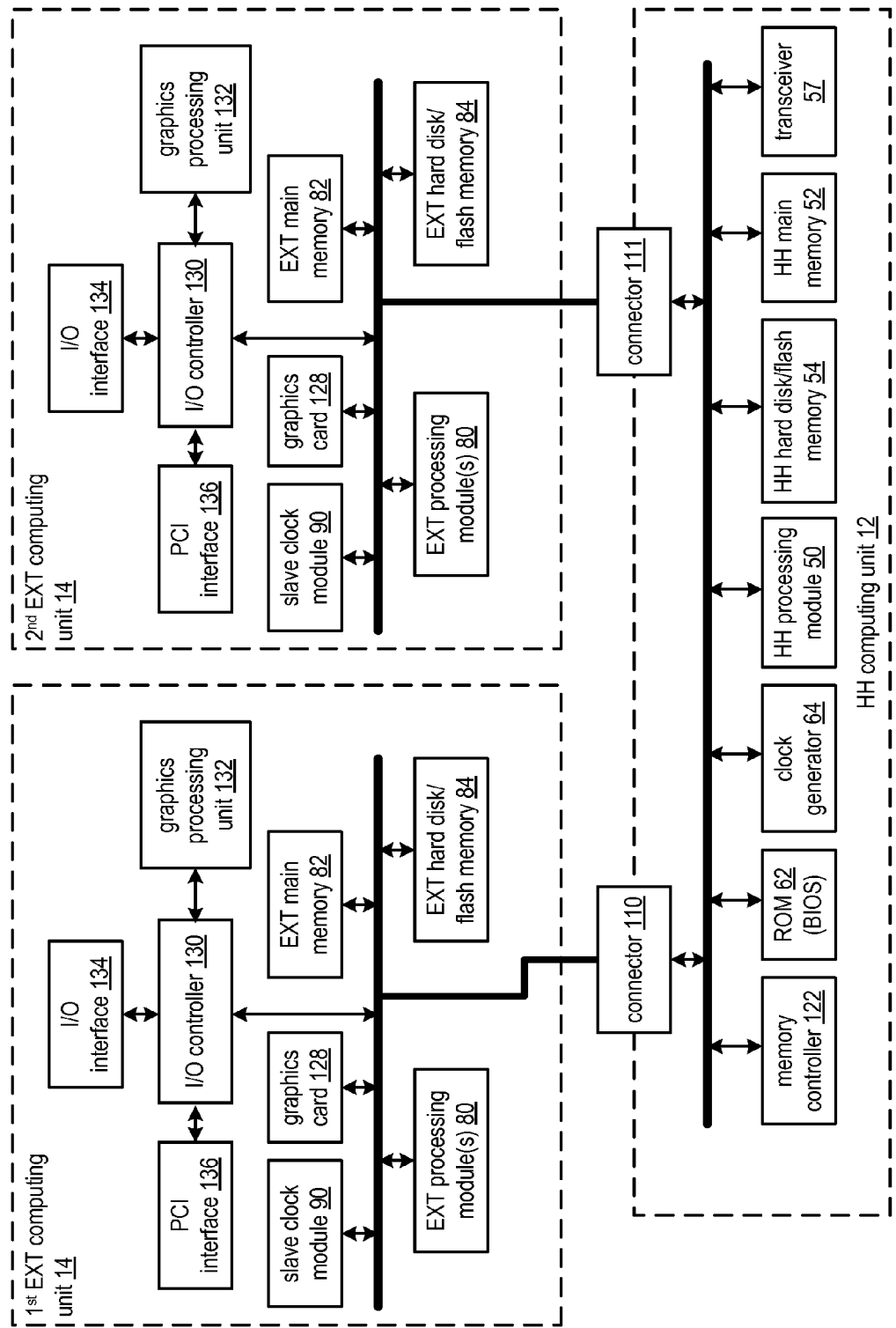
FIG. 13 is a schematic block diagram of another embodiment of a handheld computing unit docked to multiple extended computing units in accordance with the present invention.

FIG. 13 is a schematic block diagram of another embodiment of a handheld computing unit 12 coupled to multiple extended computing units 14. The core components of the handheld computing unit 12 include the HH processing module 50, the HH main memory 52, the HH hard disk/flash memory 54, the baseband processing module 56, the RF section 58, the ROM 62, the handheld connection structure 110 and 111, and the memory controller 122. The core components of each of the extended computing units 14 include the corresponding connection structure 110 and 111, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 coupled to the extended computing units 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 14-30, the computing device 10 is ready to execute a user application.

In an embodiment, the memory controller 122 is within the handheld computing unit 12 and is coupled to the I/O controller 130, the graphics card 128, the EXT processing module 80, and the EXT main memory of each EXT computing unit via the connector structures 110 and 111. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

Within each of the extended computing units, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

FIG. 14 is a table of an example of devices within a handheld computing unit 12 and an extended computing unit 14 that may be active in various modes of the handheld computing device 12. In this example, the computing device 10 may include one or more of the following in the handheld computing unit 12 and/or in the extended computing unit 14, where the status of the device is dependent on the mode of the handheld computing unit. The list of devices includes, but is not limited to, a power supply, a removable drive, a CD-ROM/DVD-ROM drive, a tape drive, a hard drive, a floppy drive, a host controller, AGP expansion slots, PCI expansion slots, a video card and/or a graphics card, RAM, a real time clock (RTC), CMOS memory for storing configuration information, a BIOS, a microprocessor, a USB connection, a mouse port, a keyboard port, a network connection, a parallel port, serial ports, flash memory slots, and a cellular telephone functionality.

When the handheld computing unit 12 is in the remote mode, the power supply for the extended computing unit 14 is off, as such, all of the devices of the extended computing unit are off. In this mode, power for the handheld computing unit is provided by a battery and the listed components are enabled (e.g., on). When the handheld computing unit 12 is in the quasi docked mode, the power supply of the extended computing unit is on and the extended computing unit devices are activated and/or deactivated as indicated. Similarly, the handheld computing unit devices are activated and/or deactivated as indicated. When the handheld computing unit 12 is in the docked mode, the battery is disabled and the handheld computing unit 12 is powered by the power supply of the extended computing unit 14. In addition, the extended computing unit 14 may include a battery charger to charge the battery of the handheld computing unit. The devices of the units 12 and 14 are activated and/or deactivated as indicated. Accordingly, when the handheld device is in different modes, different operating systems are used as will be subsequently described.

Figure 15:
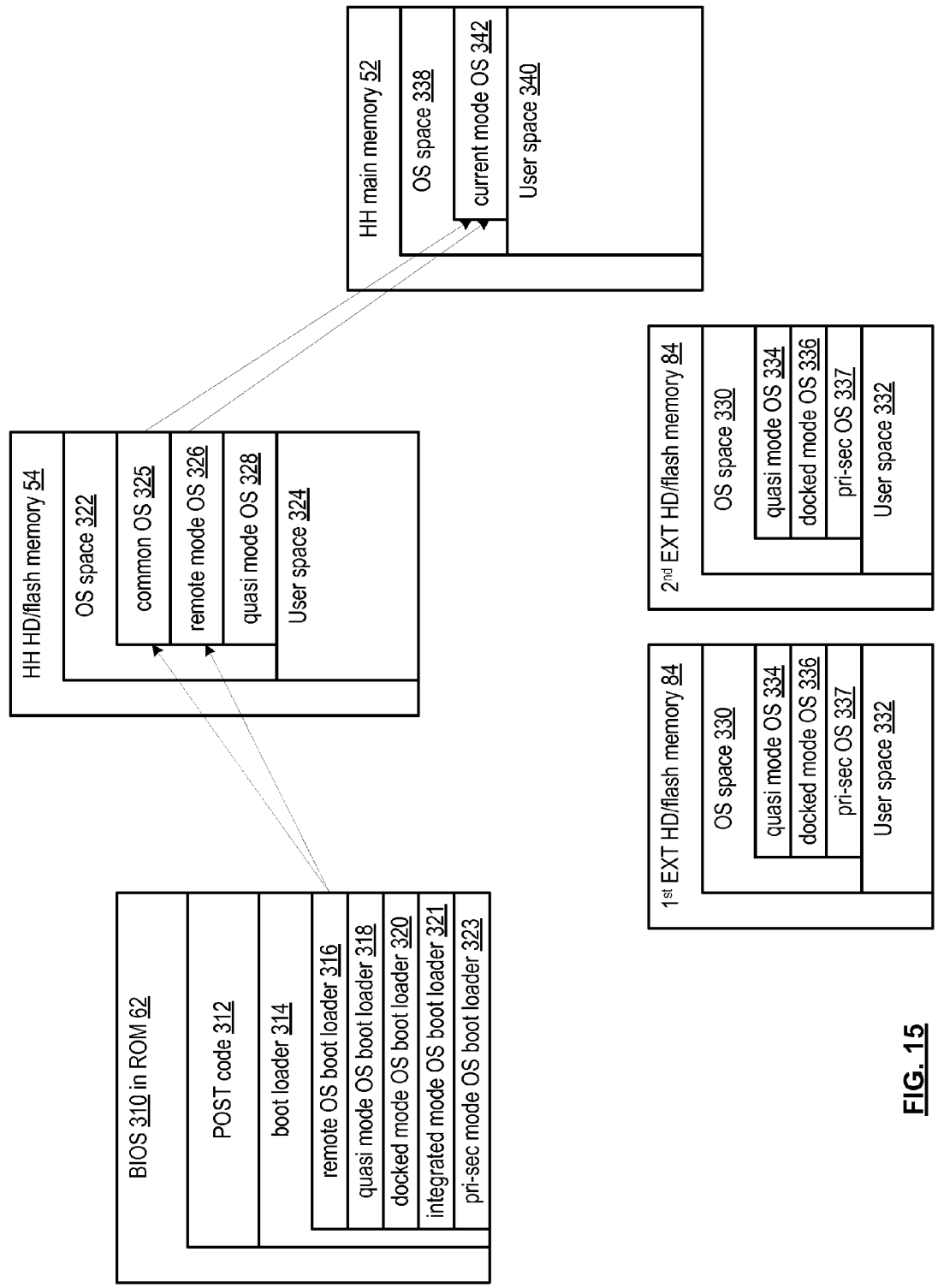
FIG. 15 is a diagram of an example of accessing BIOS and an operating system from memory of a handheld computing unit and an extended computing unit in accordance with the present invention.

FIG. 15 is a diagram of an example of accessing the BIOS 310 and an operating system from memory of a handheld computing unit 12 and extended computing units 14. In this example, the BIOS 310 is stored in ROM 62 of the handheld computing unit 12. The BIOS 310 includes a power on self test (POST) code section 312 and a boot loader section 312, which includes a remote mode operating system boot loader section 316, a quasi docked mode operating system (OS) boot loader section 318, a single EXT docked mode OS boot loader section 320, a multiple EXT integrated mode boot OS loader section 321, and a multiple EXT primary-secondary mode boot OS loader section 323.

In this example, the HH hard disk/flash memory 54 includes an operating system space 322 and a user space 324. The OS space 322 includes the common OS section 325, an remote mode OS section 326, and a quasi docked mode OS section 328. The EXT hard disk/flash memory 84 of each of the EXT computing units includes an OS space 330 and a user space 332. The OS space 330 includes a quasi mode OS section 334, a docked mode OS section 336 (used for both single EXT mode and multiple integrated EXT mode), and a primary-secondary mode OS 337. Since each mode of operation of the handheld computing device 12 utilizes different devices, each mode has a correspondingly different operating system that includes common OS components and exclusive OS components.

When the handheld computing unit is in the remote mode, which is determined during execution of the POST code 312, the remote mode operating system (OS) boot loader 316 is accessed. The remote mode OS boot loader 316, which may be a multiple stage boot loader, points to the common OS section 325 and to the remote mode OS section 326 of the HH hard disk/flash memory 54. The common OS section 325 includes operating system functions that are common for certain devices, processes, files, and/or applications of the handheld computing unit 12 regardless of the mode and the remote mode OS section includes operating system functions are unique to certain other devices, processes, files, and/or applications of the handheld computing unit when it is in the remote mode. Note that the common OS functions may be considered a subset of the remote operating system functions, of quasi-docked operating system functions, and/or of docked operating system functions.

The remote mode OS boot loader 316 instructs the HH processing module 50 and/or memory controller 122, if included within the handheld computing unit 12, to facilitate the transfer of the common OS functions, or at least a portion thereof, and the remote OS functions, or at least a portion thereof, to the HH main memory 52. The HH main memory 52 has an OS space 338 and a user space 340. The OS space 338 is used to store the current mode OS 342, which, in this example, is the remote mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

When the handheld computing unit is in the quasi docked mode, which is determined during execution of the POST code 312, the quasi docked mode operating system (OS) boot loader 318 is accessed. The quasi docked mode OS boot loader 318, which may be a multiple stage boot loader, points to the common OS section 325, to the quasi docked mode OS section 328 of the HH hard disk/flash memory 54, and may further point to the quasi docked mode OS section 334 of the EXT hard disk/flash memory 84. The quasi docked OS section 328 includes operating system functions that are unique to certain devices, processes, files, and/or applications of the handheld computing unit 12 and the quasi docked OS section 334 includes operating system functions that are unique to certain devices, processes, files, and/or applications of the extended computing unit when the handheld computing unit is in the quasi docked mode.

In this example, the quasi docked mode OS boot loader 318 instructs the HH processing module 50 and/or memory controller 122, if included within the handheld computing unit 12, to facilitate the transfer of the common OS functions, or at least a portion thereof, and the quasi docked OS functions, or at least a portion thereof, from the HH hard disk/flash memory 54 to the HH main memory 52. In addition, the quasi docked mode OS boot loader 318 instructs the HH processing module 50 and/or memory controller 122 to facilitate a transfer of the quasi docked OS functions, or at least a portion thereof, from the EXT hard disk/flash memory 84 to the OS space 338 of the HH main memory 52. The OS space 338 is used to store the current mode OS 342, which, in this example, is the quasi docked mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

Figure 16:
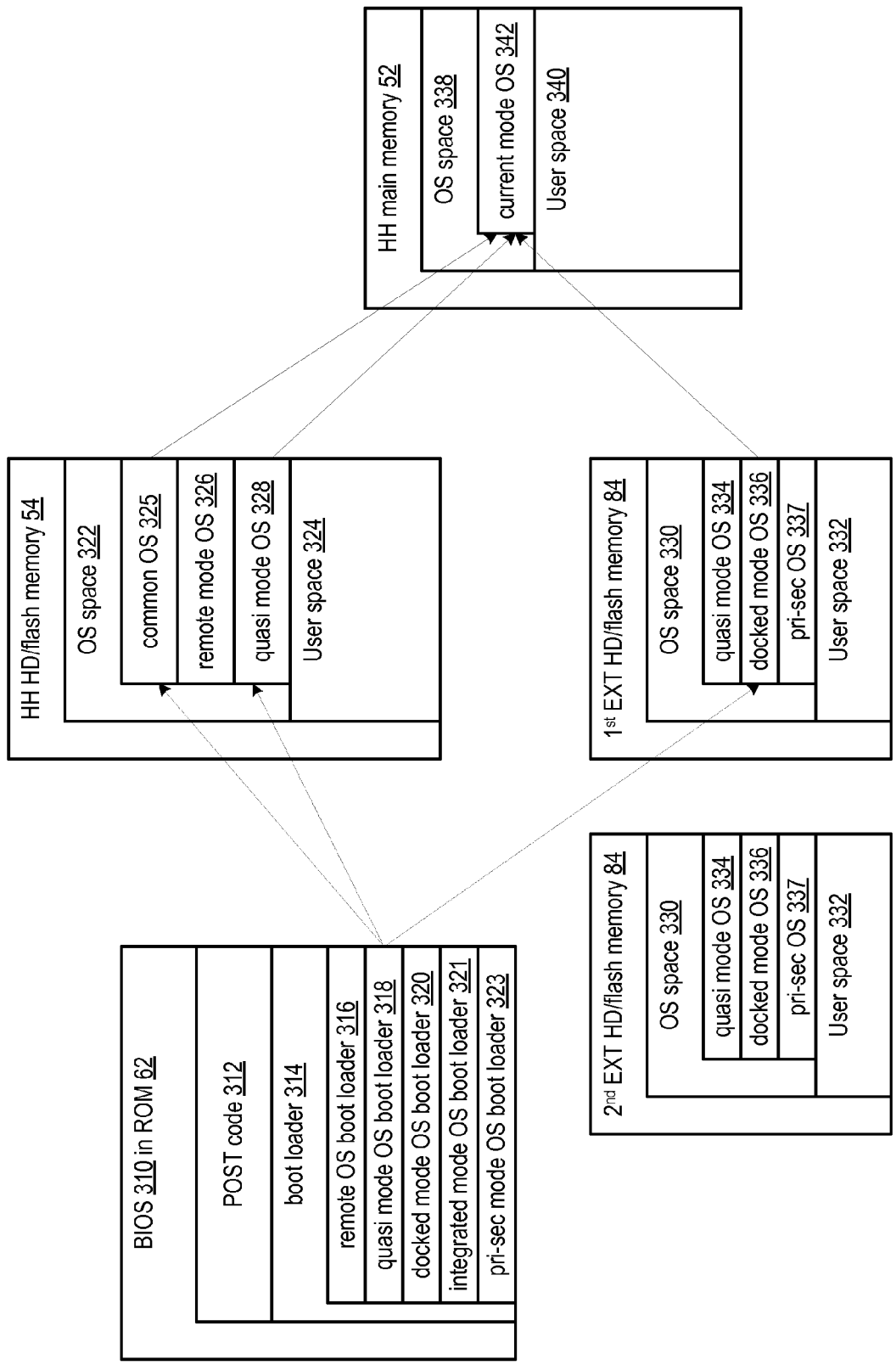
FIG. 16 is a diagram of another example of accessing BIOS and operating system from memory of a handheld computing unit and an extended computing unit in accordance with the present invention.

FIG. 16 is a diagram of another example of accessing the BIOS 310 and an operating system from memory of a handheld computing unit 12 and an extended computing unit 14. In this example, the handheld computing unit is in the docked mode, which is determined during execution of the POST code 312. As such, the docked mode operating system (OS) boot loader 320 is accessed. The docked mode OS boot loader 320, which may be a multiple stage boot loader, points to the common OS section 325 and to the docked mode OS section 336 of the EXT hard disk/flash memory 84. The docked OS section 336 includes operating system functions that are unique to certain devices, processes, files, and/or applications of the extended computing unit when the handheld computing unit is in the docked mode.

In this example, the docked mode OS boot loader 320 instructs the HH processing module 50 and/or memory controller 122, if included within the handheld computing unit 12, to facilitate the transfer of the common OS functions, or at least a portion thereof, and the docked OS functions, or at least a portion thereof, from the EXT hard disk/flash memory 84 to the HH main memory 52. The OS space 338 is used to store the current mode OS 342, which, in this example, is the docked mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

Figure 17:
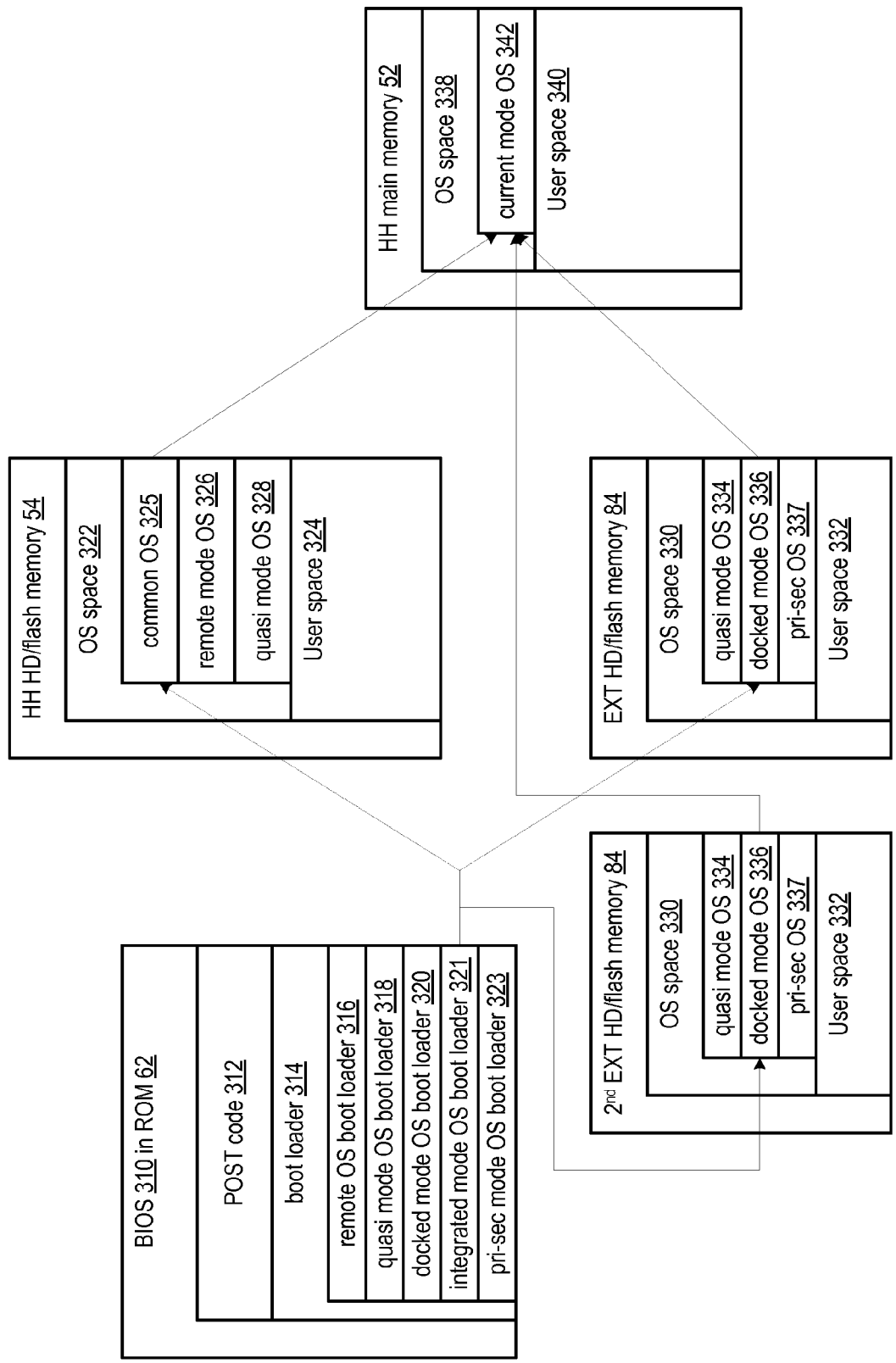
FIG. 17 is a diagram of another example of accessing BIOS and operating system from memory of a handheld computing unit and an extended computing unit in accordance with the present invention.

FIG. 17 is a diagram of another example of accessing the BIOS 310 and an operating system from memory of a handheld computing unit 12 and the extended computing units 14. In this example, the handheld computing unit is in the multiple EXT integrated mode, which is determined during execution of the POST code 312. As such, the integrated mode operating system (OS) boot loader 321 is accessed. The integrated mode OS boot loader 321, which may be a multiple stage boot loader, points to the common OS section 325, to the docked mode OS section 336 of the EXT hard disk/flash memory 84 of each of the EXT units. The docked OS section 336 includes operating system functions that are unique to certain devices, processes, files, and/or applications of the extended computing units when the handheld computing unit is in the integrated mode.

In this example, the integrated mode OS boot loader 321 instructs the HH processing module 50 and/or memory controller 122, if included within the handheld computing unit 12, to facilitate the transfer of the common OS functions, or at least a portion thereof, and the docked OS functions, or at least a portion thereof, from the EXT hard disk/flash memories 84 to the HH main memory 52. The OS space 338 is used to store the current mode OS 342, which, in this example, is the integrated mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

Figure 18:
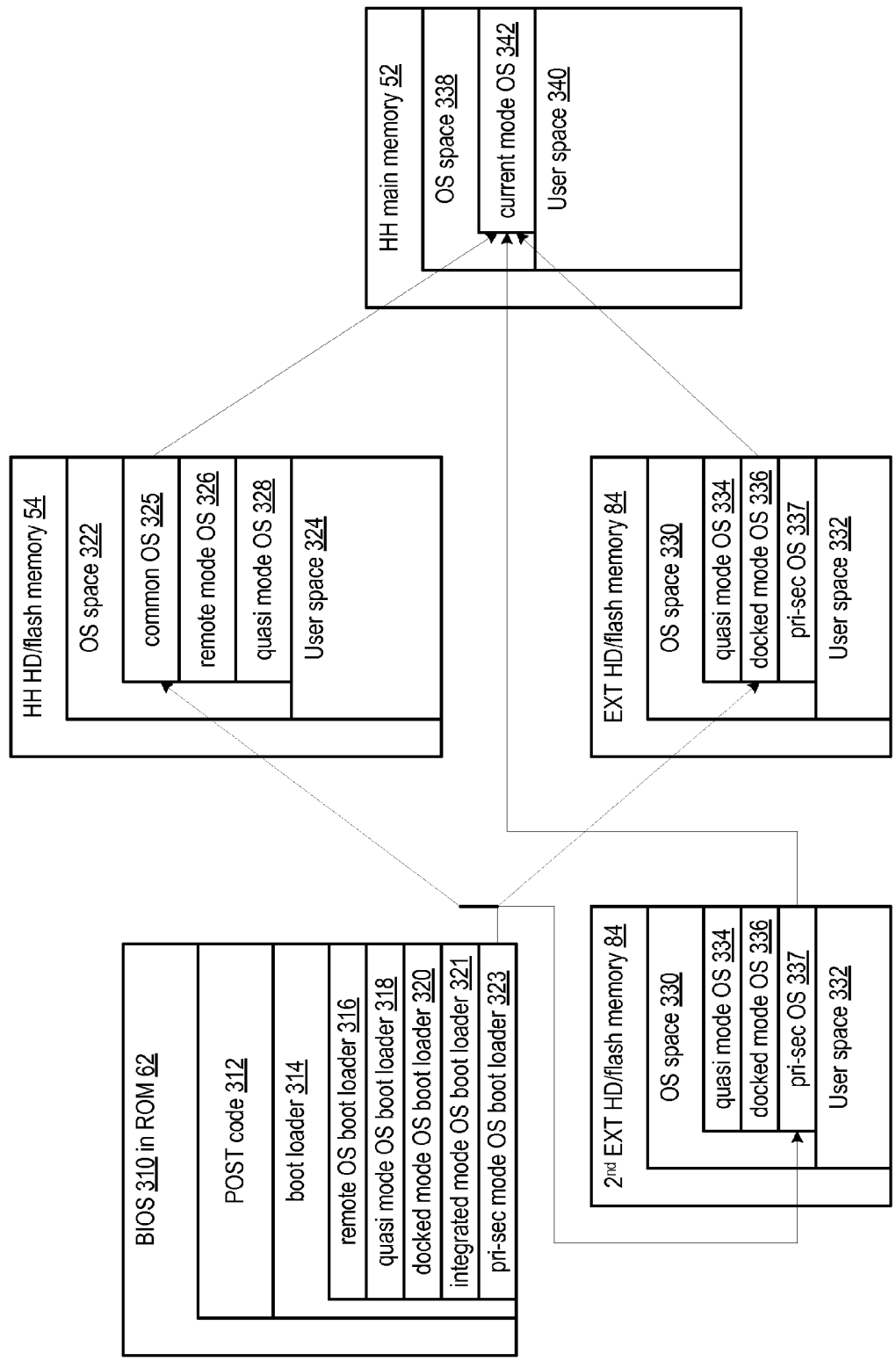
FIG. 18 is a diagram of another example of accessing BIOS and operating system from memory of a handheld computing unit and an extended computing unit in accordance with the present invention.

FIG. 18 is a diagram of another example of accessing the BIOS 310 and an operating system from memory of a handheld computing unit 12 and the extended computing units 14. In this example, the handheld computing unit is in the multiple primary-secondary EXT mode, which is determined during execution of the POST code 312. As such, the primary-secondary mode operating system (OS) boot loader 323 is accessed. The primary-secondary mode OS boot loader 323, which may be a multiple stage boot loader, points to the common OS section 325, to the docked mode OS section 336 of the EXT hard disk/flash memory 84 of one of the EXT units and to the primary-secondary OS section 337 of the other EXT unit. The docked OS section 336 includes operating system functions that are unique to certain devices, processes, files, and/or applications of the extended computing unit. The primary-secondary OS section 337 includes operating system functions that place certain devices, processes, files, and/or applications of the extended computing unit in a subordinate, or co-processing, mode to the HH unit and the other EXT unit.

In this example, the primary-secondary mode OS boot loader 323 instructs the HH processing module 50 and/or memory controller 122, if included within the handheld computing unit 12, to facilitate the transfer of the common OS functions, or at least a portion thereof, the docked OS functions, or at least a portion thereof, from the EXT hard disk/flash memory 84 to the HH main memory 52; and the primary-secondary OS, or portion thereof, from the EXT hard disk/flash memory 84 to the HH main memory 52. The OS space 338 is used to store the current mode OS 342, which, in this example, is the primary-secondary mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

FIG. 19 is a schematic block diagram of another embodiment of a computing device 10 in the integrated mode that includes a handheld computing unit 12 coupled to the extended computing units 14. In this diagram, the computing device 10 includes computer level applications 39, computer level application programming interfaces (API) 33, a computer level operating system 27, and computer level hardware 21. The computer level applications 39 include system applications (e.g., input/output device drivers, peripheral device drivers, printer spoolers, video graphics, etc.) and user applications (e.g., database programs, word processing programs, spreadsheet programs, audio playback programs, video playback programs, etc.).

The hardware 21 portion of the computing device 10 includes core hardware 23 on the handheld (HH) computing unit 12 and hardware 25 of the EXT computing units 14. The hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The hardware 25 of each of the EXT computing unit 14 may include one or more of: a hard disk and/or flash memory, main memory, a co-processing module, RAM, ROM, slave clock circuitry, an audio IO interface, a video IO interface, a data IO interface, and may further include a memory controller.

In this instance, the hardware of the HH computing unit 12 is the core hardware of the computing device 10 and the hardware of the EXT computing units 14 provides an extension of the HH hardware 23. For example, the processing module of the HH computing unit 12 may use the processing modules of the EXT computing units 14 as co-processors, as auxiliary processors, as part of a multiple-processor core, or not use it at all. As another example, the HH computing unit 12 may use the main memories of the EXT computing units 14 as an extension of its main memory, as auxiliary main memories (e.g., use as a backup copy), as a second layer of cache (e.g., L1 or L2 cache), or not use it at all.

The operating system 27 includes a core operating system 29 stored in memory of the HH computing device 12 and operating system extensions 31 stored on the EXT computing units 14. The operating system of the computing device 10 is discussed in detail with reference to FIGS. 20-36 of the parent application referenced above and as may further be described herein. In general, the core operating system 29 provides the primary operating system for the computing device 10 and the EXT operating systems 31 augment the primary operating system for further functionality when the HH computing unit 12 is docked to the EXT computing units 14.

The computer level API 33 includes APIs 35 that are stored on the HH computing unit 12 and APIs 37 that are stored on the EXT computing units 14. Similarly, the computer level applications 39 include applications 41 that are stored on the HH computing unit 12 and applications 43 stored on the EXT computing units 14. As described in the parent patent application, applications may reside on the handheld computing unit 12 (e.g., cellular telephone applications) or on the extended computing unit 14. The applications may be swapped therebetween such that, when the HH computing unit 12 is not docked to the EXT computing unit 14, the HH computing unit 12 can store the applications 39 of interest to the user of the HH computing device 12 in a mobile mode (i.e., not docked).

FIG. 20 is a schematic block diagram of another embodiment of a computing device 10 where the handheld computing unit 12 is not docked to the extended computing units 14. In this instance, HH computing unit 12 functions as a stand-alone mobile device while the EXT computing units 14 are substantially non-operational. As shown, the architecture of the HH computing unit 12 includes vertical functional coupling of the hardware 23, the operating system 29, the API 35, and the applications 41. As is also shown, the EXT computing units 14 do not include vertical functional coupling since each of the blocks (e.g., hardware 25, operating system 31, API 37, and applications 43) are extensions of the corresponding blocks of the HH computing unit 12. In this manner, there is only one hardware core and one operating system for a computing device 10 that operates in one of extended modes similar to a personal computer and in a non-docked or mobile manner similar to a cellular telephone with personal digital assistance capabilities, digital audio player capabilities, digital video player capabilities, handheld computing capabilities, and/or other mobile computing capabilities.

Figure 21:
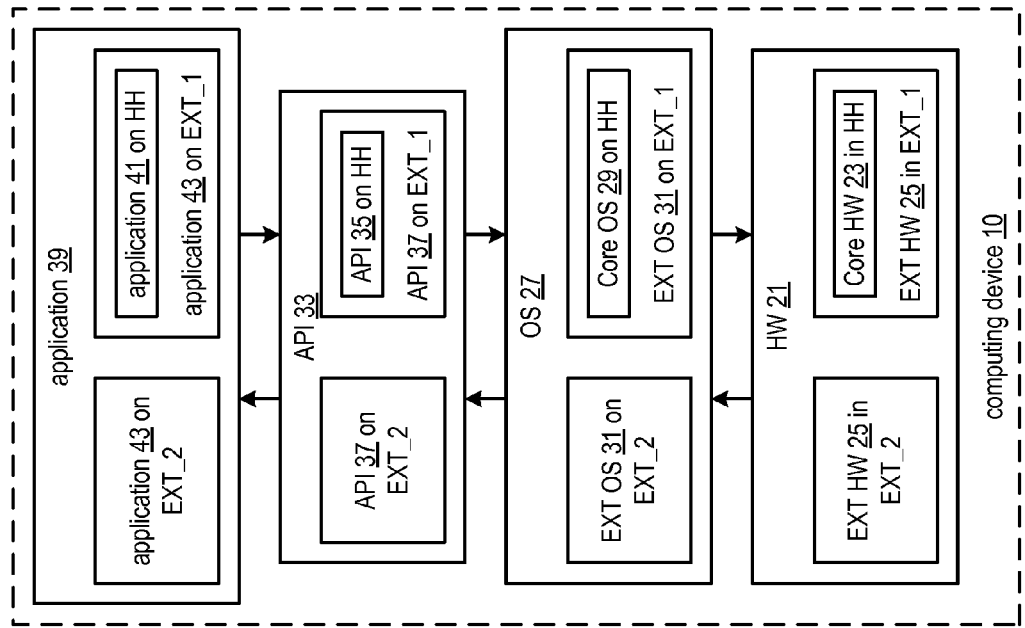
FIG. 21 is a diagram of another example of a handheld computing unit coupled to multiple extended computing units in accordance with the present invention.

FIG. 21 is a schematic block diagram of another embodiment of a computing device 10 in the primary-secondary mode that includes a handheld computing unit 12 coupled to the extended computing units 14. In this diagram, the computing device 10 includes computer level applications 39, computer level application programming interfaces (API) 33, a computer level operating system 27, and computer level hardware 21. The computer level applications 39 include system applications (e.g., input/output device drivers, peripheral device drivers, printer spoolers, video graphics, etc.) and user applications (e.g., database programs, word processing programs, spreadsheet programs, audio playback programs, video playback programs, etc.).

The hardware 21 portion of the computing device 10 includes core hardware 23 on the handheld (HH) computing unit 12 and hardware 25 of the EXT computing units 14. The hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The hardware 25 of each of the EXT computing unit 14 may include one or more of: a hard disk and/or flash memory, main memory, a co-processing module, RAM, ROM, slave clock circuitry, an audio IO interface, a video IO interface, a data IO interface, and may further include a memory controller.

In this instance, the hardware of the HH computing unit 12 is the core hardware of the computing device 10 and the hardware of one of the EXT computing units 14 provides the core hardware for the computing device 10. For example, the processing module of the HH computing unit 12 may use the processing module of one of the EXT computing units 14 as co-processors, as auxiliary processors, as part of a multiple-processor core, or not use it at all. As another example, the HH computing unit 12 may use the main memories of the EXT computing units 14 as an extension of its main memory, as auxiliary main memories (e.g., use as a backup copy), as a second layer of cache (e.g., L1 or L2 cache), or not use it at all. The hardware of the other EXT unit may not be used or used in a subordinate manner.

The operating system 27 includes a core operating system 29 stored in memory of the HH computing device 12 and operating system extensions 31 stored on the EXT computing units 14. In general, the core operating system 29 provides the primary operating system for the computing device 10 and the EXT operating system 31 of one of the EXT units augments the primary operating system for further functionality when the HH computing unit 12 is docked to the EXT computing units 14. In this instance, the operating system of the other EXT unit is not used.

The computer level API 33 includes APIs 35 that are stored on the HH computing unit 12 and APIs 37 that are stored on the EXT computing units 14. Similarly, the computer level applications 39 include applications 41 that are stored on the HH computing unit 12 and applications 43 stored on the EXT computing units 14.

Figure 22:
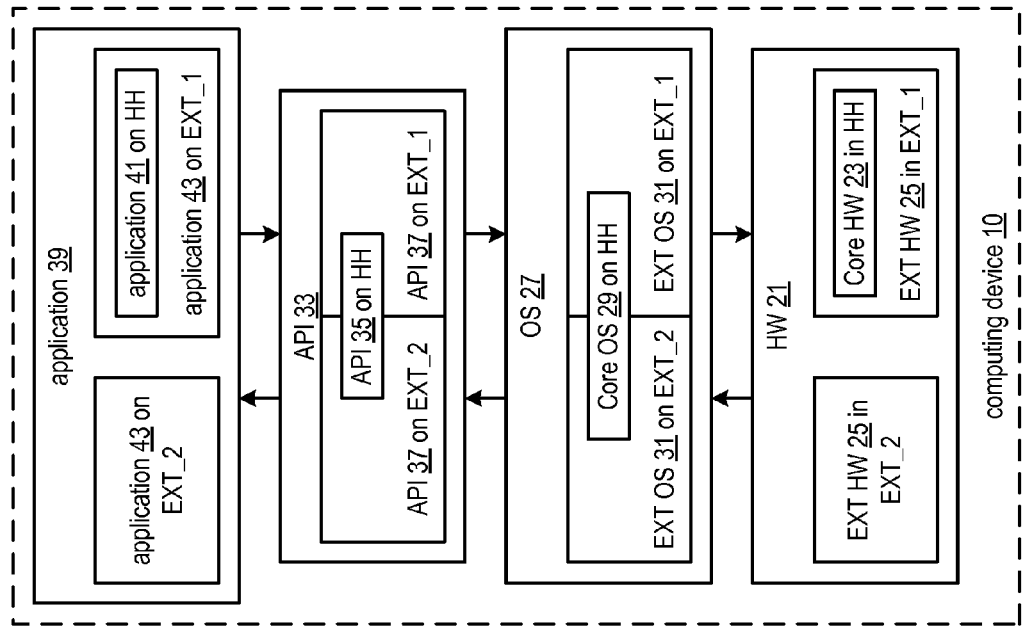
FIG. 22 is a diagram of another example of a handheld computing unit coupled to multiple extended computing units in accordance with the present invention.

FIG. 22 is a schematic block diagram of another embodiment of a computing device 10 where some of the sections are in the primary-secondary mode and other sections are in the integrated mode. In this example, the API section 33 and the OS section 27 are in the integrated mode and the application section 39 and the hardware section 21 are in the primary-secondary mode.

Figure 23:
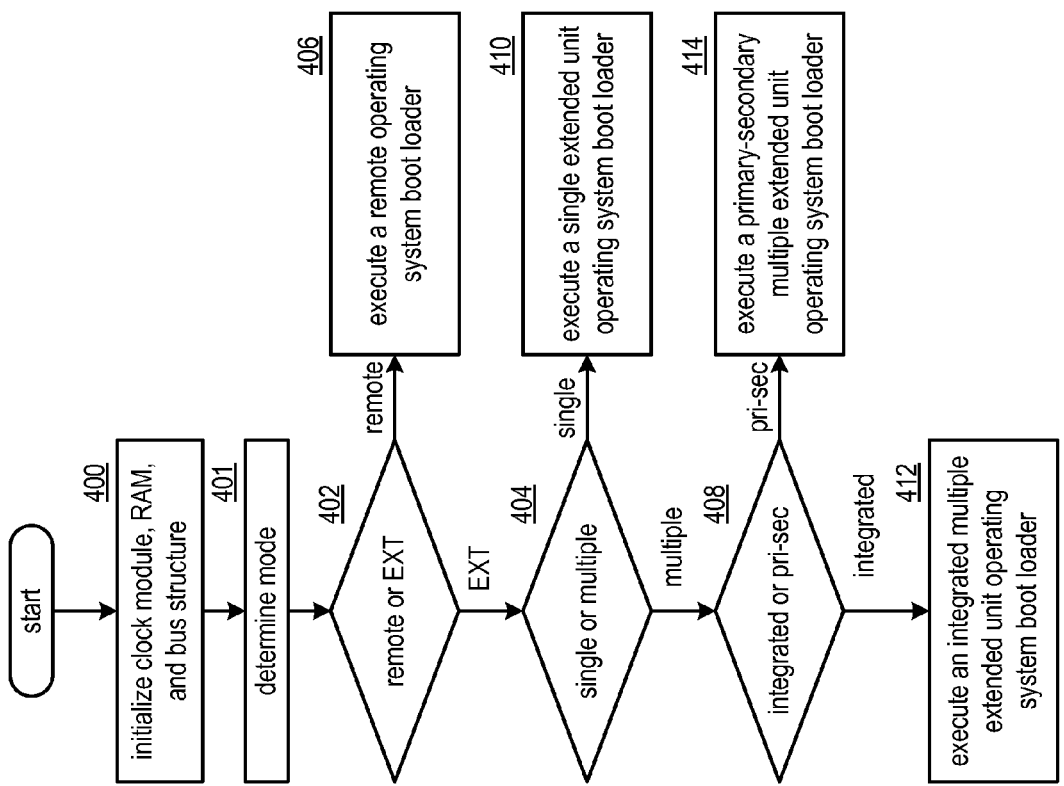
FIG. 23 is a logic diagram of an embodiment of a method for coupling a handheld computing unit to multiple extended computing units in accordance with the present invention.

FIG. 23 is a logic diagram of an embodiment of a method for coupling a handheld computing unit to multiple extended computing units that begins at step 400 where the handheld computing unit initializes a clock module, RAM, and the bus structure (e.g., a portion of the interconnection structure). The method continues at step 401 where the HH unit determines its mode of operation. This may be done by determining whether is not connected to an EXT unit, to one EXT unit, or to multiple EXT units. When connected to multiple EXT units, the determination continues by determining a first connection status between the handheld computing unit and a first extended computing unit and a second connection status between the handheld computing unit and a second extended computing unit. When each of the first and second connection statuses indicates a first type of connection (e.g., both are a high speed connections), identifying the integrated mode and, when the first connection status indicates the first type of connection and the second connection status indicates a second type of connection (e.g., a high speed connection to one EXT unit and a lower speed connection to another EXT unit), identifying the primary-secondary mode.

The method branches at step 402 depending on whether the HH unit is in a remote mode or one of the EXT modes. When in the remote mode, the method continues at step 406 where the HH unit executes the remote OS boot loader. If the HH unit is in one of the EXT modes, the method continues at step 404 where the HH unit determines whether the mode is a single EXT mode or a multiple EXT mode. When the mode is a single EXT mode, the method continues at step 410 where the HH unit executes the single EXT OS boot loader 320.

If the HH unit is in the multiple EXT mode, the method branches at step 408 depending on whether the HH unit is in the integrated EXT mode or the primary-secondary mode. When the handheld computing unit is in the integrated multiple extended unit mode, the method continues at step 412 where the HH unit executes the integrated multiple extended unit operating system boot loader 321. When the handheld computing unit is in a primary-second multiple extended unit mode, the method continues at step 414 where the HH unit executes the primary-secondary multiple extended unit operating system boot loader 323.

Figure 24:
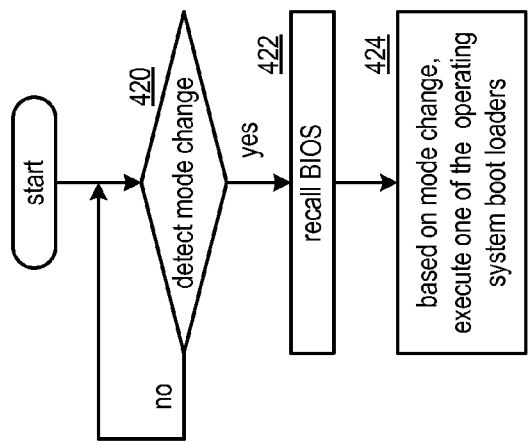
FIG. 24 is a logic diagram of another embodiment of a method for coupling a handheld computing unit to multiple extended computing units in accordance with the present invention.

FIG. 24 is a logic diagram of another embodiment of a method for coupling a handheld computing unit to multiple extended computing units that begins at step 420 where the HH unit determines whether a mode change is detected (e.g., switch from remote to an EXT mode, switch from one EXT mode to another, etc.). If a mode change is detected, the method continues at step 422 where the HH unit recalls the Basic Input/Output System (BIOS), which includes a remote operating system (OS) boot loader, a single extended computing unit mode OS boot loader, the integrated multiple extended unit OS boot loader, and the primary-secondary multiple extended unit OS boot loader. The method continues at step 424 where the HH unit, based on a type of mode change, executes one of the remote OS boot loader, the single extended computing unit mode OS boot loader, the integrated multiple extended computing unit OS boot loader, and the primary-secondary multiple extended computing unit OS boot loader.

Figure 25:
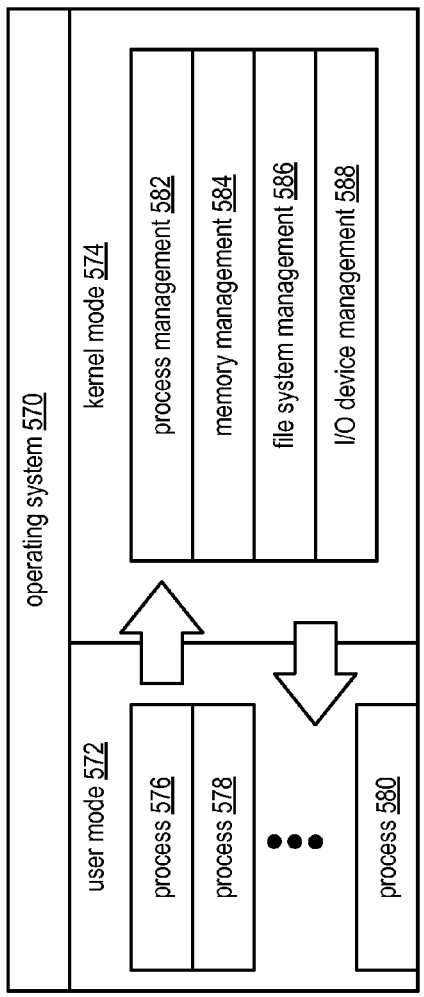
FIG. 25 is a diagram of an embodiment of an operating system in accordance with the present invention.

FIG. 25 is a diagram of an embodiment of an operating system 570 that includes a user mode section 572 and a kernel mode section 574. The user mode section 772 includes a plurality of processes 576-580, which correspond to one or more running user applications. The operating system 570 includes the common operating system 325, the remote operating system 326, the quasi mode operating system 328 and 334, and the docked operating system 336. Each of the remote, quasi mode, and the docked mode operating systems include the common operating system 325. In addition, each of the operating systems includes one or more processing management kernels 582, one or more memory management kernels 584, one or more file system management kernels 586, and one or more I/O device management kernels 588. While not shown, the operating system 570 may further include one or more graphical user interface kernels, one or more security kernels, and/or one or more networking kernels.

In general, the kernel section 574 functions to connect an application to the hardware resources of a computing device. In this regard, the kernel section 574 manages the computing device's resources (e.g., multi-processing capabilities, processing module run time, main memory, hard disk memory, network throughput, I/O devices, communication between hardware and software components, etc.) and provides the lowest-level software abstraction layer. Note that the kernel section 574 may include monolithic kernels and/or micro-kernels.

The process management kernel section 582 provides one or more kernels to allow and support execution of one or more processes. A process is the execution of an application's operating instructions and several processes may be associated with the same application. When the handheld computing unit is in a remote mode, the HH processing module may function as a single central processing unit that executes one instruction at a time. In this embodiment, the HH processing module may use a time-sharing process to allow seemingly concurrent execution of multiple processes. In another embodiment, the HH processing module includes a multi-processor core that supports actual concurrent execution of multiple processes, where each processing core may use the time-sharing process to allow more processes to run at once. When the handheld computing unit 12 is in the docked mode, the HH processing module and the EXT processing module function collectively to provide the multi-processor core. Note that each of the HH and EXT processing modules may include its own multi-processor core such that, when functioning collectively, the number of processors is further increase.

To run an application, a kernel of the process management kernel section 582 sets up an address space for the application, loads the file containing the application's code into memory, sets up a stack for the application and branches to a given location inside the application to start its execution. Several applications may be supported by using multi-tasking kernels, pre-emptive multi-tasking kernels, cooperative multi-tasking kernels, and/or multiprocessing. A multi-tasking kernel schedules access to the HH processing module and/or EXT processing module among a plurality of processes in an orderly manner. The scheduling may be done in a variety of ways including multiprogramming, time-sharing, and real-time.

A pre-emptive multi-tasking kernel allocates each process a slice of time and switches from process to process in accordance with the time slices to provide the illusion of concurrent execution. The size of the time slices may vary from process to process and may be adjusted and/or reallocated based on priority of other processes. The kernel also provides a mechanism for the processes sharing the processing resources to communication with one another, which is generally referred to as inter-process communication (IPC), which may be done by sharing memory, message passing, and/or a remote procedure calls.

A cooperative multi-tasking kernel allows a process to run uninterrupted until it makes a special request that tells the kernel it may switch to another process. The special request may be the result of a response to an inter-process communication or the process is waiting for an event to occur.

A multiprocessing kernel allows different processes and/or threads to run on different processors (e.g., the HH processing module and the EXT processing module). The kernel provides a synchronization mechanism to ensure that no two processors attempt to modify the same data at the same time.

The memory management kernel section 684 provides one or more kernels to control access to the HH main memory, the HH hard disk/flash memory, the EXT main memory, and/or the EXT hard disk/flash memory. In general a memory management kernel has full access to the computing device's memory and controls a process' access to the memory. This includes establishing virtual addressing using paging and/or segmentation. The virtual address spaces may be different for different processes (e.g., the memory that one process accesses at a particular (virtual) address may be different memory from what another process accesses at the same virtual address). The operating system maintains a page table to track the virtual addresses association to physical addresses and the allocation of the virtual memory to particular processes. The virtual memory allocations are tracked so that when a process terminates, the memory used by that process can be made available for other processes. In this manner, the memory management kernel allows each process to function as if it the only process running.

The file system management kernel section 586 includes one or more kernels to control a file system for file storage and/or file transfers. The file system uses the EXT hard disk/ flash memory, the EXT CD-ROM drive, the HH hard disk/flash memory, etc. to store and organizes files and/or applications for ease of finding and accessing. In an embodiment, the file system includes directories that associate file names with files. This may be done by connecting the file name to an index into a file allocation table. The directory structure may be flat (no subdirectories) or hierarchical (includes subdirectories). The directory may further include meta data regarding a file. The meta data may include file length, a byte count, time the file was last modified, file creation time and/or date, time and/or date the file was last accessed, any changes to the meta data, owner's identity, creator's identity, access permission settings, etc.

The file system may be a disk file system, a flash file system, a database file system, a transactional file system, and/or a special purpose file system. In an embodiment, each of the various modes of the operating system has its own file system. For example, the remote mode operating system has a file system that utilizes the HH hard disk/flash memory 54; the quasi docked mode operating system has a file system that has a hierarchical preference for the HH hard disk/flash memory 54 over the EXT hard disk/flash memory 84; and the docked mode operating system has a file system that has a hierarchical preference for the EXT hard disk/flash memory 84 or the HH hard disk/flash memory 54.

The I/O device management kernel section 588 includes one or more kernels that manage I/O device processing resource and/or memory resource allocation requests. As an example, a process may need to access an I/O device (e.g., the HH display), which is controlled by the kernel through a device driver. As a more specific example, to show the user something on the HH display, an application would make a request to the kernel, which would forward the request to its display driver, which plots the character/pixel for display.

The operating system 570 may security features. The security may include levels: internal security and external security. The internal security is the protection of the computing device's resources from concurrently running applications performing the same process at the same time. In this instance, applications and/or processes thereof are assigned a privilege level, which blocks less privileged applications and/or processes from using certain hardware instructions, certain processing resources, accessing certain memory spaces, etc. When an application or process is blocked, it must ask a higher privileged application or process to perform the task for it.

For external security, the computing device may include a software firewall or an intrusion detection/prevention system. The software firewall is configured to allow or deny network traffic to or from a service or application running on the operating system.

The operating system 570 further includes graphical user interfaces (GUI) for the handheld computing unit and the extended computing unit. The GUI may be for a touch screen, a keypad, an LCD display, a monitor, and vary depending on the applications being used. For example, when the handheld computing unit is in a cellular telephone mode, the GUI may be adapted for the cell phone. As another example, when the handheld computing unit is a GPS receiver mode, the GUI may be adapted to for GPS operations. When the handheld computing unit is docked to the extended computing unit, the GUI may resemble a personal computer and/or laptop GUI.

Figure 26:
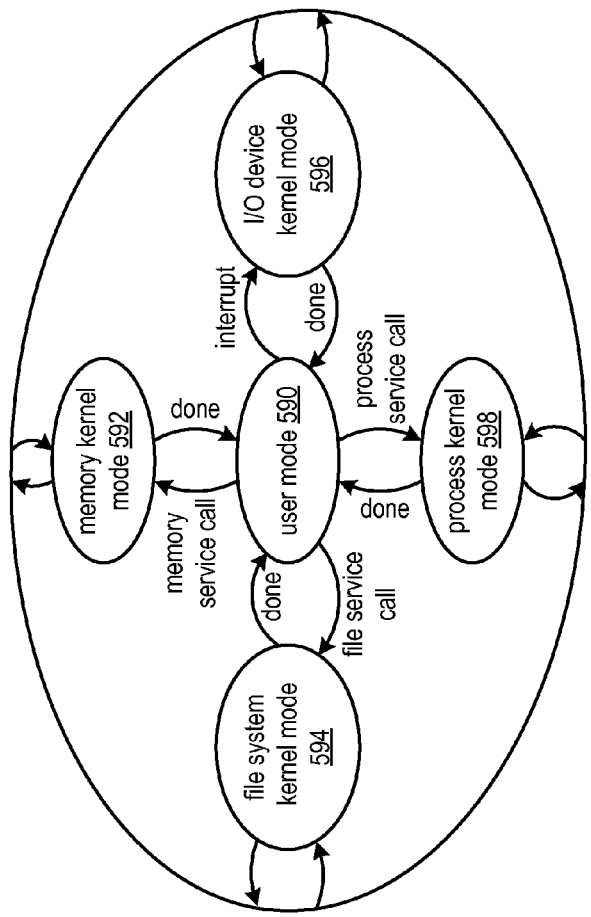
FIG. 26 is a state diagram of an embodiment of an operating system in accordance with the present invention.

FIG. 26 is a state diagram of an embodiment of the operating system 570. The operating system 570 may be in the remote mode, the quasi docked mode, or the docked mode. In any of these modes, the operating system has five states: a user mode 590, a memory kernel mode 592, a file system kernel mode 594, an T/O device kernel mode 596, and a process kernel mode 598. From the user mode state 590, the operating system may transition to any one of the kernel states in response to a service call or a trap. In a kernel state, the operating system may transition to any other kernel state or back to the user mode state.

As an example, assume that the handheld computing unit is in the remote mode and is executing a user application and the operating system is in the user mode state 590 for this user application. The executing of the user application includes one or more processes that require access to the HH computing unit's resources. When a process needs a resource, it generates a service call and/or evokes a trap. When the process service call or the trap is detected, the operating system transitions to the process kernel state 598 for a process service call, to the I/O kernel mode for an I/O service call, to the memory kernel mode 592 for a memory service call, or to the file system kernel mode for a file service system call. Assuming that the service call was a process service call, the operating system is in state 598 and beings to process the process service call. The process service call may be to have a series of operational instructions executed by the HH processing module, may be to store data, may be to read data, may be use certain data while executing the operational instructions, may be to display data, may be to receive data, etc.

Figures 29, 30:
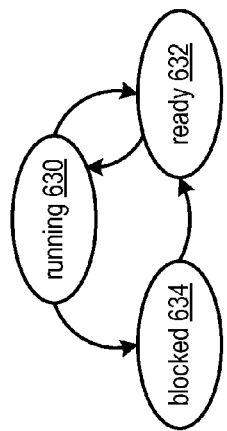
FIG. 29 is a state diagram of an embodiment of a process in accordance with the present invention.
FIG. 30 is a diagram of an example of a process table in accordance with the present invention.

If the process service call is to execute operational instructions, the process management kernel schedules the process for access to the HH processing module based on the state of the process. As shown in FIG. 29, a process may be in a blocked state 634, a running state 630, or a ready state 632. If the process is in a blocked state 634, it is dependent on some other process, memory management function, and/or file management function to be completed before it can execute its current task. When the dependency is removed, the process transitions into the ready state 632. The process remains in this state until the resource it has requested is allocated to it. When allocated, the process transitions to the running state 603.

Returning to the state diagram of FIG. 26, after the process is scheduled and/or the process is completed, the operating system transitions back to the user state 590. If the process service call includes requesting access to the processing module and to store the results, the operating system would also transition to the memory kernel state 592 and the file system kernel state 594 to fulfill the storage request service call.

When an I/O device desires access to the processing module, to a file, and/or to the memory, it issues an interrupt. When the operating system receives the interrupt, it transitions to the I/O device kernel mode to process the interrupt, which may be for access to the file system, access to the processing module, and/or access to the memory. As such, from the I/O kernel state 596, the operating system may transition to the process kernel state 598, the file system kernel state 594, and/or to the memory kernel state 592. Note for from application to application and/or process to process, the operating system may be in different states at any one time.

Figure 27:
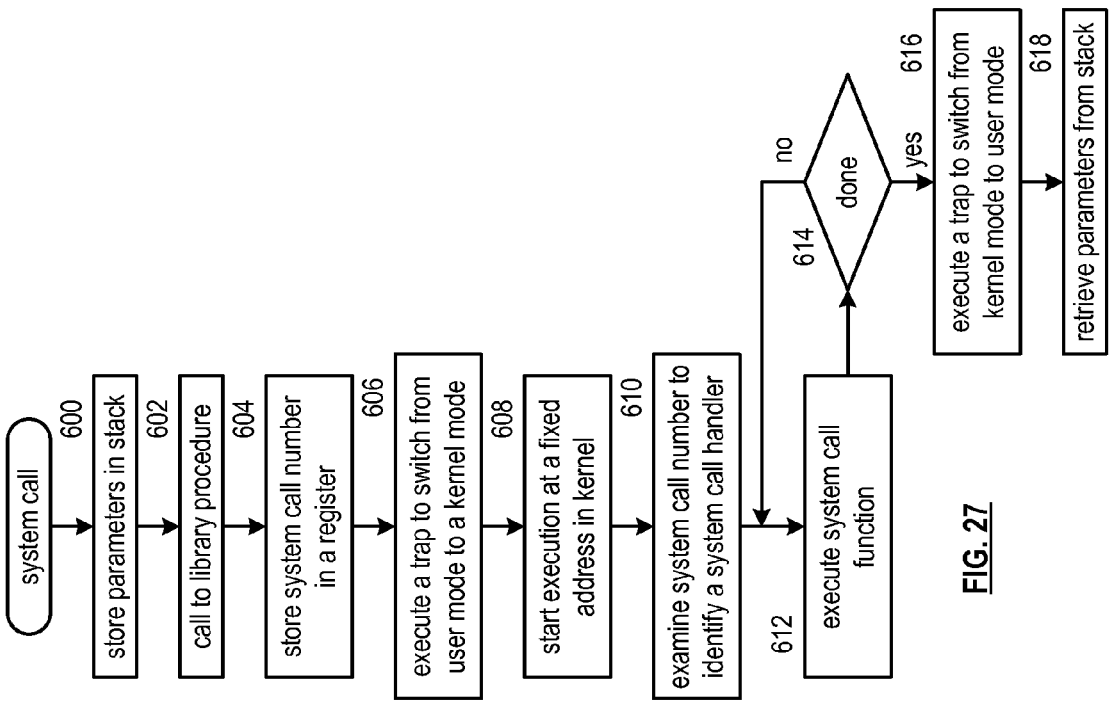
FIG. 27 is a logic diagram of an embodiment of a method processing a service call in accordance with the present invention.

Further examples of service calls include:
Process management
  create a child process
  create a process (at system initiation, per system call, per user request, per batch job)
  delete a process (normal, error, fatal error, killed by another process)
  wait for child to terminate
  replace a process' core image
  terminate process execution and return status File management
   open a file for reading and/or writing
   close an open file
   read data from a file into a buffer
   write data from a buffer into a file
   move the file pointer
   get file status information
Directory and file system management
   create a new directory
   remove an empty directory
   create a new entry, name, name pointer (shortcut)
   remove a directory entry
   mount a file system
   unmount a file system FIG. 27 is a logic diagram of an embodiment of a method processing a service call that begins at step 600 where, when the handheld device is in a quasi docked mode, the HH processing module receives a system call from a handheld application, a quasi mode application, a handheld block I/O device, an extended block I/O device, or a handheld character I/O device. The method continues at step 602 where the HH processing module store parameters of the system call in a quasi mode stack. The parameters include current location in an application, current pointer information, memory locations, and/or any other data that allows the application to pick up where it left off after its service call is processed.

Figure 28:
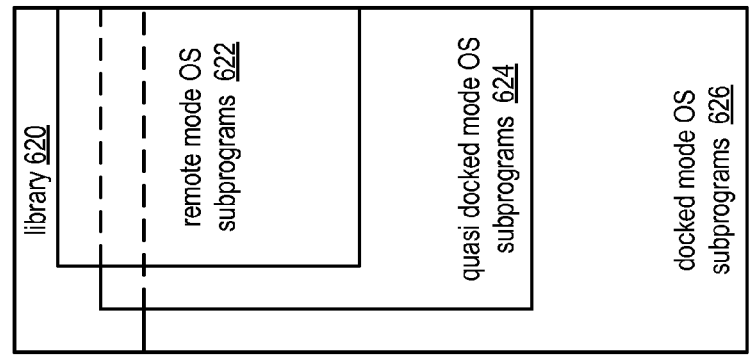
FIG. 28 is a diagram of an example of a subprogram library in accordance with the present invention.

The method continues at step 604 where the HH processing module calls a quasi mode subprogram library to retrieve a subprogram (e.g., a handler) to support the fulfillment of the service call. FIG. 28 is an example of a library 320 that includes remote mode OS subprograms 622, quasi mode OS subprograms 624, and docked mode OS subprograms 624. As shown, the subprograms overlap such that when the handheld computing unit is in the docked mode, it may call a subprogram from any of the OS subprograms 622-626. Conversely, when the handheld computing unit is in the remote mode, it may only call subprograms for the remote OS subprogram section 622.

The library 620 may be static library or a dynamically linked library. An embodiment of a static library includes of a set of routines which are copied into a target application by the compiler, linker, or binder, producing object files and a stand-alone executable file. Actual address, references for jumps and other routine calls are stored in a relative address or symbolic which cannot be resolved until all code and libraries are assigned final static addresses. The linker resolves the unresolved addresses into fixed or virtual addresses.

In an embodiment, a dynamic linking library loads the subroutines of a library into an application program at runtime, rather than at compile time. This reduces the compile time of the linker since it records what library routines the program needs and the index names in the library. At the loading of an application, a loader transfers the relevant portions of the library from the hard disk to the main memory, which may be in the handheld and/or extended computing unit.

Returning to the discussion of FIG. 27, the method continues at step 606 where the HH processing module updates a process table for the system call for the application and/or one of it processes. FIG. 30 illustrates an example of a process table that includes a column for each of the processes that are active. The data stored for each process includes processing information 642 (e.g., register locations, program counter (PC), status word, stack pointer, process state, priority, schedule parameters, process ID<parent process, signals, process start time, processing user time, children use time, time of and/or next alarm), memory information 644 (e.g., pointer to text (e.g., code, instructions, etc.) segment, pointer to data segment, and pointer to stack segment), and file information 646 (e.g., root directory, working directory, file description, user ID, and/or group ID).

Returning to the discussion of FIG. 27, the method continues at step 608 where the HH processing module executes a trap to switch to a kernel quasi docked mode (e.g., process, memory, file, I/O device). The method continues at step 608 where the HH processing module identifies a system call handler to provide access to higher level software layers for the system call. At step 612, the system call is processed, which may be done by the HH processing module executing a higher level layer operation system subroutine. When the system call has been processed, which may done as previously discussed with reference to FIG. 27, the method proceeds from step 614 to step 616.

At step 616, the HH processing module executes another trap to return to a user mode. The method continues at step 608 where the HH processing module retrieves parameters from the stack such that the application can resume processing where it left off when it initiated the service call.

The method of FIG. 27 is also applicable when the handheld computing unit is in the remote mode. At step 600, the HH processing module receives a system call from a handheld application, a handheld block I/O device, or a handheld character I/O device. Steps 602-618 include store parameters of the system call in a remote mode stack, call a remote mode subprogram library; update process table for the system call; execute a trap to switch to a kernel remote mode; identify system call handler for the system call; when processing the system call is complete, executing another trap to return to a user mode and retrieve parameters.

The method of FIG. 27 is also applicable when the handheld computing unit is in the docked mode. At step 600, the HH processing module receives a system call from a handheld application, a docked mode application, a handheld block I/O device, an extended block I/O device, or an extended character I/O device. Steps 602-618 include store parameters of the system call in a docked mode stack, call a docked mode subprogram library; update process table for the system call; execute a trap to switch to a kernel docked mode; identify system call handler for the system call; when processing the system call is complete, executing another trap to return to a user mode; and retrieve parameters.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A handheld computing unit comprises:
    a processing module;
    memory;
    a transceiver;
    a first extended computing unit interface;
    a second extended computing unit interface, wherein the first extended computing unit interface and the second extended computing unit interface are operable to support one of a plurality of multiple extended unit modes that include an integrated mode and a primary-secondary mode; and
    an interconnection structure operably coupled to the processing module, the memory, the transceiver, and the first and second extended computing unit interfaces.

2. The handheld computing unit of claim 1 further comprises:
    in the integrated mode of the plurality of multiple extended unit modes, the first extended computing unit interface is coupled to a first extended computing unit and the second extended computing unit interface is coupled to a second extended computing unit such that the processing module functions in a multiple processor mode with a processing module of the first extended computing unit and a processing module of the second extended computing unit; or
    in the primary-secondary mode of the plurality of multiple extended unit modes, the first extended computing unit interface is coupled to the first extended computing unit and the second extended computing unit interface is coupled to the second extended computing unit such that the processing module functions in a multiple processor mode with the processing module of the first extended computing unit and the processing module of the second extended computing unit functions as a co-processor.

3. The handheld computing unit of claim 2, wherein the memory comprises:
    a first memory module that stores an operating system, wherein, when the handheld computing unit is in the integrated mode, the operating system section is combined with an operating system of the first extended computing unit and an operating system the second extended computing unit to produce a computing device operating system; and
    when the handheld computing unit is in the primary-secondary mode, the operating system section is combined with the operating system of the first extended computing unit to produce the computing device operating system.

4. The handheld computing unit of claim 2, wherein the memory comprises:
    a second memory module that stores applications, wherein, when the handheld computing unit is in the integrated mode, the applications are combined with applications of the first extended computing unit and applications of the second extended computing unit to produce computing device applications; and
    when the handheld computing unit is in the primary-secondary mode, the applications the applications are combined with applications of the first extended computing unit to produce computing device applications.

5. The handheld computing unit of claim 1, wherein each of the first and second extended computing unit interfaces comprises at least one of:
    a hard-wired connection;
    firmware to support dedicated local wireless link;
    firmware to support shared local wireless link; and
    firmware to support a shared wide area wireless link.

6. The handheld computing unit of claim 1 further comprises:
    a memory controller coupled to the processing module and the memory, wherein, when the handheld computing unit is in the integrated mode of the plurality of multiple extended unit modes, the memory controller configures the memory and memory of a first and second extended computing units as computing device memory and, when the handheld computing unit is in the primary-secondary mode of the plurality of multiple extended unit modes, the memory controller configures the memory and the memory of the first extended computing unit as the computing device memory, wherein memory controller identifies the memory of the second extended computing unit as secondary memory or off-line memory.

7. The handheld computing unit of claim 1, wherein the memory comprises:
    a Basic Input/Output System (BIOS) section that stores a remote operating system (OS) boot loader, a single extended computing unit mode OS boot loader, an integrated multiple extended computing unit OS boot loader, and a primary-secondary multiple extended computing unit OS boot loader.

8. The handheld computing unit of claim 1 further comprises:
at least one integrated circuit that includes the processing module, the memory, the transceiver, and the interconnection structure.

9. The handheld computing unit of claim 8, wherein the at least one integrated circuit further comprises at least one of the first and second extended computing unit interfaces.

10. A handheld computing unit comprises:
a processing module;
memory;
a transceiver;
a first extended computing unit interface;
a second extended computing unit interface; and
an interconnection structure operably coupled to the processing module, the memory, the transceiver, and the first and second extended computing unit interfaces, wherein, at start up, the handheld computing unit is operable to:
determine mode of the handheld computing unit;
when the handheld computing unit is in an integrated multiple extended unit mode, execute an integrated multiple extended unit operating system boot loader; and
when the handheld computing unit is in a primary-second multiple extended unit mode, execute a primary-secondary multiple extended unit operating system boot loader.

11. The handheld computing unit of claim 10, wherein the handheld computing unit, during the start up, is operable to determine the mode by:
determining a first connection status between the handheld computing unit and a first extended computing unit;
determining a second connection status between the handheld computing unit and a second extended computing unit;
when each of the first and second connection statuses indicates a first type of connection, identifying the integrated mode; and
when the first connection status indicates the first type of connection and the second connection status indicates a second type of connection, identifying the primary-secondary mode.

12. The handheld computing unit of claim 10 further comprises:
retrieving an integrated multiple extended unit operating system from the memory and memory of first and second extended computing units in response to executing the integrated multiple extended unit operating system boot loader; and
retrieving a primary-secondary multiple extended unit operating system from the memory and the memory of the first extended computing unit in response to executing the primary-secondary multiple extended unit operating system boot loader.

13. The handheld computing unit of claim 10 further comprises:
the processing module operable to:
detect a mode change;
recall a Basic Input/Output System (BIOS), wherein the BIOS includes a remote operating system (OS) boot loader, a single extended computing unit mode OS boot loader, the integrated multiple extended unit OS boot loader, and the primary-secondary multiple extended unit OS boot loader; and
based on a type of mode change, execute one of the remote OS boot loader, the single extended computing unit mode OS boot loader, the integrated multiple extended computing unit OS boot loader, and the primary-secondary multiple extended computing unit OS boot loader.

14. The handheld computing unit of claim 10 further comprises:
a clock module; and
the memory including random access memory (RAM), wherein prior to determining the mode of the handheld computing unit, the handheld computing unit is operable to:
initialize the clock module;
initialize the RAM; and
initialize at least a portion of the interconnection module.

15. The handheld computing unit of claim 10 further comprises the handheld computing unit is operable to:
determine mode of the handheld computing unit;
when the handheld computing unit is in a remote mode, execute remote mode operating system boot loader; and
when the handheld computing unit is in a single extended unit mode, execute a single extended unit operating system boot loader.

16. The handheld computing unit of claim 10 further comprises:
at least one integrated circuit that includes the processing module, the memory, the transceiver, and the interconnection structure.

17. The handheld computing unit of claim 16, wherein the at least one integrated circuit further comprises at least one of the first and second extended computing unit interfaces.

* * * * *

UNITED STATES PATENT AND TRADEMARK OFFICE
CERTIFICATE OF CORRECTION

PATENT NO.       : 8,195,860 B2
APPLICATION NO.  : 12/393463
DATED            : June 5, 2012
INVENTOR(S)      : Rofougaran Page 1 of 1

It is certified that error appears in the above-identified patent and that said Letters Patent is hereby corrected as shown below:

In the Claim
Col. 30, line 19, in claim 3: after "operating system" insert --of--
Col. 30, line 36, in claim 4: replace "the applications the applications" with --the applications--
Col. 31, lines 27-28, in claim 10: replace "primary-second" with --primary-secondary--
Col. 32, lines 34-35, in claim 15: after "further" delete "comprises the handheld computing unit is"

Signed and Sealed this
Seventeenth Day of December, 2013

Margaret A. Focarino
*Commissioner for Patents of the United States Patent and Trademark Office*